United States Patent
Bond et al.

(10) Patent No.: US 9,440,148 B2
(45) Date of Patent: Sep. 13, 2016

(54) PHYSICS SIMULATION APPARATUS AND METHOD

(75) Inventors: Andrew Bond, Dublin (IE); Oliver Strunk, Munich (DE); Adrian Gasinski, Dublin (IE)

(73) Assignee: TELEKINESYS RESEARCH LIMITED, Dublin (IE)

( * ) Notice: Subject to any disclaimer, the term of this patent is extended or adjusted under 35 U.S.C. 154(b) by 1568 days.

(21) Appl. No.: 12/961,358

(22) Filed: Dec. 6, 2010

(65) Prior Publication Data

US 2011/0077923 A1    Mar. 31, 2011

Related U.S. Application Data

(62) Division of application No. 12/848,759, filed on Aug. 2, 2010, now Pat. No. 8,437,992, which is a division of application No. 11/292,788, filed on Dec. 2, 2005, now Pat. No. 7,788,071.

(60) Provisional application No. 60/633,405, filed on Dec. 3, 2004.

(51) Int. Cl.
*G06F 7/60* (2006.01)
*G06G 7/48* (2006.01)
*G06T 15/00* (2011.01)
(Continued)

(52) U.S. Cl.
CPC .............. *A63F 13/577* (2014.09); *A63F 13/10* (2013.01); *G06F 17/5009* (2013.01); *G06F 17/5095* (2013.01); *G06T 17/00* (2013.01); *A63F 13/80* (2014.09); *A63F 2300/64* (2013.01); *A63F 2300/643* (2013.01); *G06F 2217/16* (2013.01); *G06T 2210/21* (2013.01)

(58) Field of Classification Search
CPC .... A63F 13/10; A63F 13/40; A63F 2300/64; A63F 2300/643; A63F 13/577; A63F 13/80; G06F 17/50; G06F 17/5009; G06F 17/5095; G06F 2217/16; G06F 17/00; G06T 17/00; G06T 2210/21
USPC ........................................ 703/2, 6; 345/419
See application file for complete search history.

(56) References Cited

U.S. PATENT DOCUMENTS 5,947,981 A    9/1999 Cosman
6,040,835 A    3/2000 Gibson
(Continued)

OTHER PUBLICATIONS

Chung and Wang, Quick collision detection of polytopes in virtual environments, 1996, Mark Green (Ed.), Proceeding of the ACM Symposium on Virtual Reality Software and Technology, pp. 125-131.*

(Continued)

*Primary Examiner* — Kamini S Shah
*Assistant Examiner* — Juan Ochoa
(74) *Attorney, Agent, or Firm* — Dan Choi; Micky Minhas

(57) ABSTRACT

A method and apparatus wherein complex physical interactions and collisions are modeled at a high level of detail while reducing the computational demands placed on the processing system. In one embodiment the method comprising the steps of defining a first object and a second object, each object adapted for colliding with the other object; assigning an interaction type for at least one of the first and second object in response to an object parameter; and selecting between a continuous simulation of a collision and a discrete simulation of the collision in response to the interaction type.

8 Claims, 32 Drawing Sheets

US 9,440,148 B2

Page 2

(51) Int. Cl.

| | |
|---|---|
| A63F 13/577 | (2014.01) |
| A63F 13/40 | (2014.01) |
| G06F 17/50 | (2006.01) |
| G06T 17/00 | (2006.01) |
| A63F 13/80 | (2014.01) |

(56) References Cited

U.S. PATENT DOCUMENTS

| | | | |
|---|---|---|---|
| 6,054,997 A * | 4/2000 | Mirtich | G06T 17/00 345/419 |
| 6,099,573 A * | 8/2000 | Xavier | 703/7 |
| 6,167,145 A | 12/2000 | Foley et al. | |
| 6,195,625 B1 | 2/2001 | Day et al. | |
| 6,215,503 B1 | 4/2001 | Snyder et al. | |
| 6,407,748 B1 * | 6/2002 | Xavier | 345/672 |
| 6,509,899 B1 | 1/2003 | Anderson | |
| 6,714,901 B1 | 3/2004 | Cotin et al. | |
| 6,909,431 B1 | 6/2005 | Anderson | |
| 6,947,879 B2 | 9/2005 | Yamada et al. | |
| 6,958,752 B2 | 10/2005 | Jennings, Jr. et al. | |
| 7,079,145 B2 | 7/2006 | Tonge et al. | |
| 7,084,869 B2 | 8/2006 | Sriram et al. | |
| 7,129,951 B2 * | 10/2006 | Stelly, III | 345/474 |
| 7,363,199 B2 | 4/2008 | Reynolds et al. | |
| 7,421,303 B2 | 9/2008 | Zhang et al. | |
| 7,526,456 B2 | 4/2009 | Zhang et al. | |
| 2002/0180739 A1 | 12/2002 | Reynolds et al. | |
| 2002/0183992 A1 | 12/2002 | Ayache et al. | |
| 2003/0088389 A1 | 5/2003 | Balaniuk et al. | |
| 2003/0112281 A1 | 6/2003 | Sriram et al. | |
| 2004/0148268 A1 | 7/2004 | Reil | |
| 2004/0220793 A1 | 11/2004 | Hawkes et al. | |
| 2005/0075154 A1 | 4/2005 | Bordes et al. | |
| 2005/0075849 A1 | 4/2005 | Maher et al. | |
| 2005/0086040 A1 | 4/2005 | Davis et al. | |
| 2005/0162433 A1 | 7/2005 | Tonge et al. | |
| 2005/0165873 A1 | 7/2005 | Zhang et al. | |
| 2005/0165874 A1 | 7/2005 | Zhang et al. | |
| 2005/0251644 A1 | 11/2005 | Maher et al. | |
| 2006/0100835 A1 | 5/2006 | Bordes et al. | |
| 2006/0106591 A1 | 5/2006 | Bordes et al. | |
| 2006/0149516 A1 | 7/2006 | Bond et al. | |
| 2008/0020362 A1 | 1/2008 | Cotin et al. | |

OTHER PUBLICATIONS

Kelvin Chung Tat Leung, An Efficient Collision Detection Algorithm for Polytopes in Virtual Environments, 1996, M. Phil Thesis, pp. 1-77.*
S. Cameron, "Enhancing GJK: Computing Minimum and Penetration Distances Between Convex Polyhedra", IEEE, 1997, pp. 1-6.*
van den Bergen, (1998), "Efficient Collision Detection of Complex Deformable Models using AABB Trees," *Journal of Graphic Tools*, 2:1-13.
Larsen, (1998), "Minkowski Sums and Distance Computation".
van den Bergen, (1999), "A Fast and Robust GJK Implementation for Collision Detection of Convex Objects," *Journal of Graphic Tools*, 4:7-25.
Ehmann et al., (2000), "SWIFT: Accelerated Proximity Queries Using Multi-Level Voronoi Marching," Technical Report: TR00-026, University of North Carolina at Chapel Hill, 21 pages.
Ehmann et at, (2000), "Accelerated Proximity Queries Between Convex Polyhedra by Multi-Level Voronoi Marching," *Intelligent Robots and Systems*, 3:2101-2106.
van den Bergen, (1996), "Proximity Queries and Penetration Depth Computation on 3D Game Objects," *Technology*, pp. 125-131.
Anitescu M., "A Fixed Time Step Approach for Multi-Body Dynamics with Contact and Friction," *International Conference on Intelligent Robots and Systems IROS 2003*, vol. 3, pp. 3725-3731, 2003.
Anitescu M., "Modeling Rigid Multi Body Dynamics with Contact and Friction," Doctoral Thesis, University of Iowa, 1997.

Anitescu, M. and Potra F., "Formulating Dynamic Multi-rigid-body Contact Problems with Friction as Solvable Linear Complementarity Problems," *Reports on Computational Mathematics*, No. 93/1996, Department of Mathematics, The University of Iowa, 1996.
Antiescu, M. and Hart, G.D., "Solving Nonconvex Problems of Multibody Dynamics with Contact and Small Friction by Successive Convex Relaxation," *Mechanics Based Design of Structures and Machines*, vol. 31, Issue 3, pp. 335-356, Jan. 2003.
Ascher, U.M. "Stabilization of Invariants of Discretized Differential Systems," *Numerical Algorithms*, vol. 14, No. 1-3, pp. 1-24, Apr. 1997.
Ascher, U.M., Chin, H., L.R. Petzold and Reich S, "Stabilization of Constrained Mechanical Systems with DAEs and Invariant Manifolds," *Numerische Mathematik*, vol. 67, No. 2, pp. 131-149, 1994.
Baraff D., "Analytical Methods for Dynamic Simulation of Non-Penetrating Rigid Bodies," *Computer Graphics*, vol. 23, No. 3, Jul. 1989.
Baraff, D., "Fast Contact Force Computation for Nonpenetrating Rigid Bodies," *SSIGGRAPH 1994, Computer Graphics Proceedings*, pp. 23-34, 1994.
Baraff, D., "Non-Penetrating Rigid Body Simulation," *Eurographics 93 State of the Art Reports*, Barcelona, Sep. 6-10, 1993, Chapter 2.
Baraff, D.; "Interactive simulation of solid rigid bodies," *IEEE Computer Graphics and Applications*, vol. 15, Issue 3, May 1995.
Burden, R.L. and Faires, J.D., "Numerical Analysis," Fourth Edition, 1989, PWS-Kent Publishing Company.
Cline, M.B. "Rigid Body Simulation with Contact and Constraints," Master's thesis, University of British Columbia, Jul. 2002.
Cline, M.B. and Pai, D.K., "Post-Stabilization for Rigid Body Simulation with Contact and Constraints," *Proc. IEEE Intl. Conf. on Robotics and Automation*, 2003.
Delingette, H., "Toward Realistic Soft-Tissue Modeling in Medical Simulation," Proceedings of the IEEE, vol. 86, No. 3, pp. 512-523, Mar. 1998.
Keller H., Stolz, H., Ziegler, A. and Braunl T., "Virtual Mechanics Simulation and Animation of Rigid Body Systems: Aero," *Simulation*, vol. 65, No. 1, pp. 74-79, 1995.
Kry, P.G. and Pai D.K, "Continuous Contact Simulation for Smooth Surfaces," *ACM Transactions on Graphics*, vol.22, Issue 1, pp. 106-129, 2003.
Kry, P.G., "Fast Contact Evolution for Piecewise Smooth Surfaces," MS Thesis, University of British Columbia, 2000.
Lennerz C., Schomer E. and Warken T., "A framework for collision detection and response," *11th European Simulation Symposium and Exhibition* (ESS'99), 1999.
Lin, S.T. and Huang, J.N., "Stabilization of Baumgarte's Method Using the Runge-Kutta Approach," Journal of Mechanical Design, vol. 124, No. 4, pp. 633-641, 2000.
Mirtich, B., "Rigid Body Contact: Collision Detection to Force Computation," *Techical Report TR-98-01*, Mitsubishi Electrical Research Laboratory, 1998.
Mirtich, B.V., "Impulse-based Dynamic Simulation of Rigid Body Systems," Doctoral Thesis, University of California at Berkeley, 1996.
Mirtich, B.V., "Timewarp Rigid Body Simulation," *Proceedings of the 27th International Conference on Computer Graphics and Interactive Techniques*, pp. 193-200, 2000.
Moreau, J.J.; Jean, M.; "Numerical treatment of contact and friction: the contact dynamics method," *the 1996 3rd Biennial Joint Conference on Engineering Systems Design and Analysis, ESDA. Part 4 (of 9)*; Montpellier; Fr; Jul. 1-4, 1996.
Pai, D.K., Ascher, U.M. and Kry, P.G., "Forward Dynamics Algorithms for Multibody Chains and Contact," *International Conference on Robotics and Automation, ICRA 2000*, vol. 1, pp. 857-863.
Plante, E., Cani, M.-P., and Poulin P., "A Layered Wisp Model for Simulating Interactions inside Long Hair," *Eurographics Workshop on Computer Animation and Simulation*, pp. 139-148, 2001.

(56) References Cited

OTHER PUBLICATIONS

Sauer J. and Schoemer, E. "A Constraint-Based Approach to Rigid Body Dynamics for Virtual Reality Applications," *ACM Symposium on Virtual reality Software and Technology*, pp. 153-162, 1998.

Sinha, P.R. and Abel, J.M., "A Contact Stress Model for Multifingered Grasps of Rough Objects," *IEEE Transactions on Robotics and Automation*, vol. 8, No. 1, Feb. 1992.

Stewart, D. "Convergence of a Time-Stepping Scheme for Rigid Body Dynamics and Resolution of Painlevé's Problem Summary," *Archive for Rational Mechanics and Analysis*, vol. 145, No. 3, pp. 215-260, 1998.

Stewart, D.E. and Trinkle J.C., "Dynamics, Friction, and Complementarity Problems," *Proceedings of the International Conference on Complementarity Problems*, Philadelphia PA, 1996, pp. 425-439.

Sweeney et al., "Modelling Physical Objects for Simulation," *Proc. of the Winter Simulation Conference*, vol. Conf. 23, pp. 1187-1193, Dec. 8, 1991.

Trinkle, J. Pang, J.S., Sudarslcy, S., and Lo G., "On Dynamic Multi-Rigid-Body Contact Problems with Coulomb Friction," *Technical Report TR95-003*, Texas A&M University, 1995.

Harada et al., "Interactive Physically-Based Manipulation of Discrete/Continuous Models," Aug. 6-11, 1995, SIGGRAPH 95, Los Angeles, *Computer Graphics Proceedings*, Annual Conference Series, pp. 1-10.

Hilding Elmqvist, Francois E. Cellier, Martin Otter: "Object-Oriented Modeling of Hybrid Systems," 1993, ESS193, European Simulation Symposium, pp. 1-11.

Yin-Tien Wang et al., "Dynamics of rigid bodies undergoing multiple frictional contacts," 1992, Proceedings of the 1992 IEEE International Conference on Robotics and Automation, pp. 2764-2769.

Matthew Moore et al., "Collision Detection and Response for Computer Animation," Aug. 1988, *Computer Graphics*, vol. 22, No. 4, pp. 289-298.

* cited by examiner

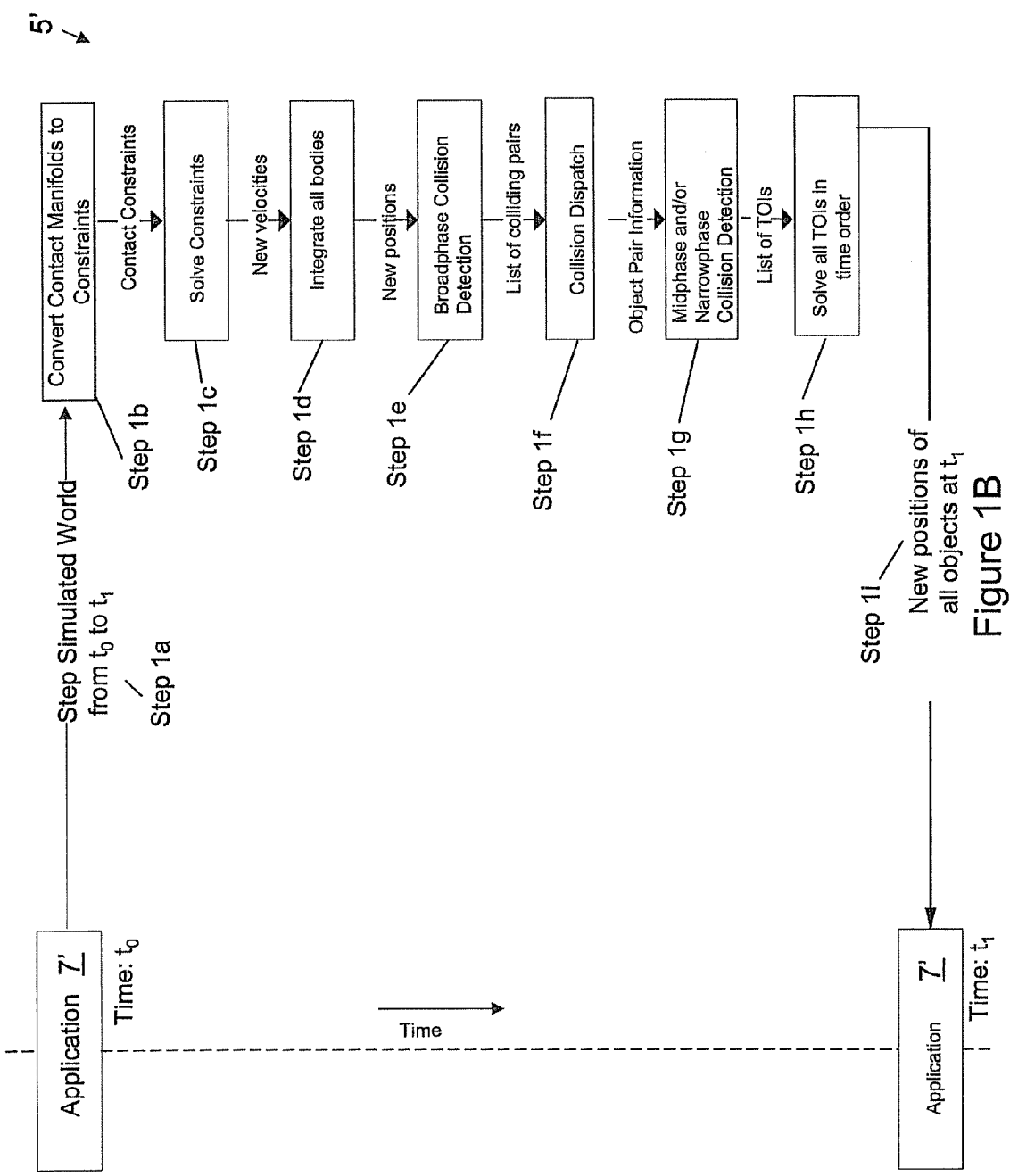

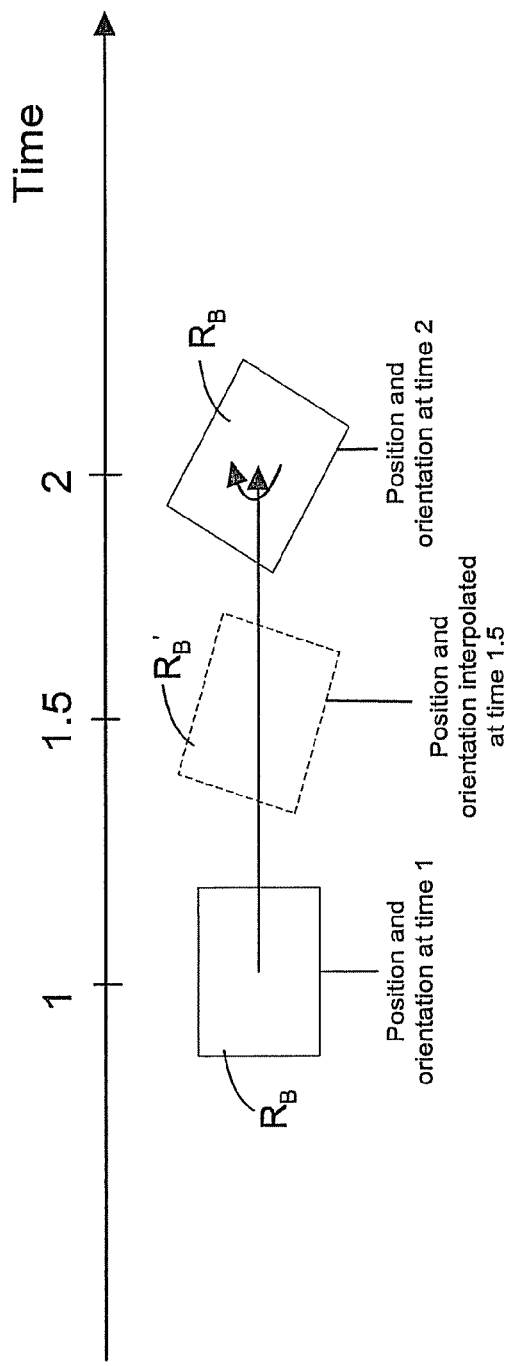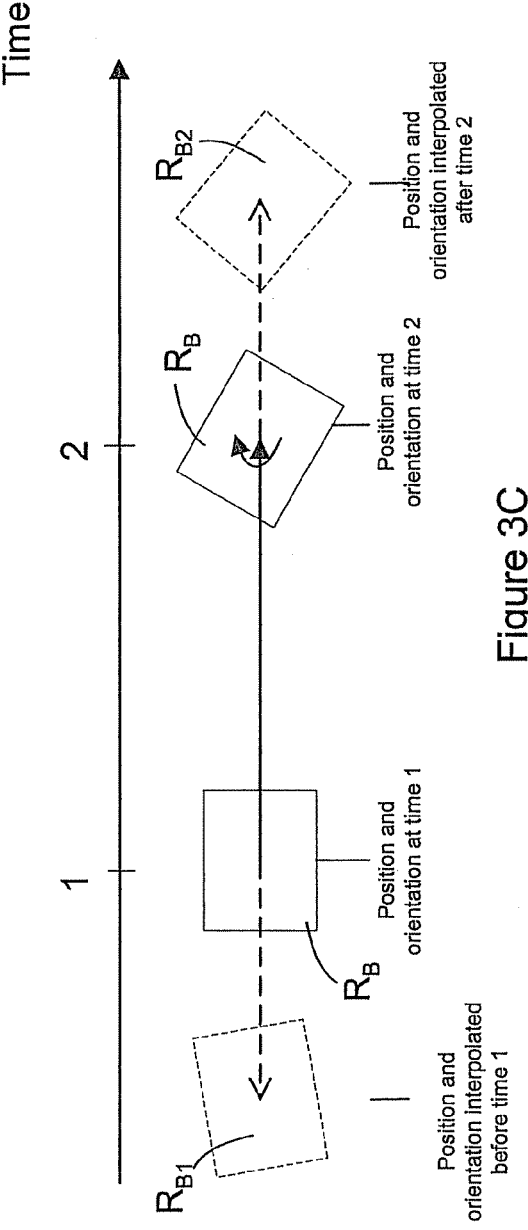
Figure 3B
Figure 3C

| | | |
|---|---|---|
| FIXED |  | For static world elements. Especially objects represented by a triangle mesh. |
| KEYFRAMED |  | Animated object with infinite mass. |
| DEBRIS |  | Low importance objects adding visual quality. |
| MOVING |  | Regular objects populating the world. Furniture, etc. |
| CRITICAL |  | Gameplay-critical objects that are never allowed to penetrate or leave the game world. |
| BULLET |  | Fast-moving projectiles. |

Figure 7A

| | | |
|---|---|---|
| PSI |  | Collisions are handled only in PSI steps. Don't generate TOI events. Allow interpenetration of objects. |
| TOI |  | Collisions generate TOI events. |
| TOI_HIGHER |  | Collisions generate TOI events. Contact constraints have higher priority in the constraint solver. This prevents interpenetration even when other objects 'push' bodies into each other. |
| TOI_FORCED |  | Same as TOI_HIGHER. Additionally extra checks are performed when this collision is triggered in a TOI event. |
| --- |  | Ignored |

Figure 7B

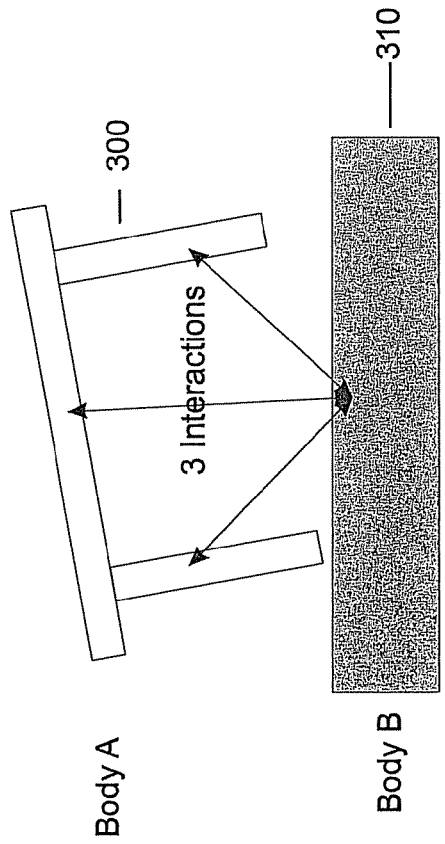
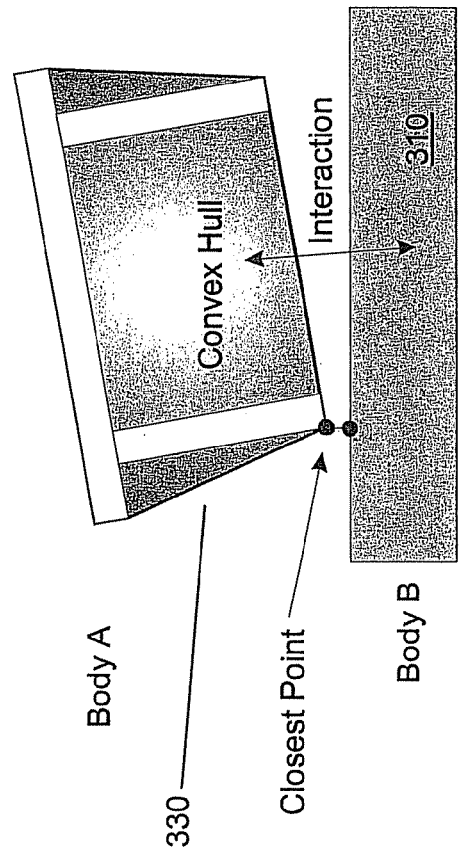
Figure 13A
Figure 13B

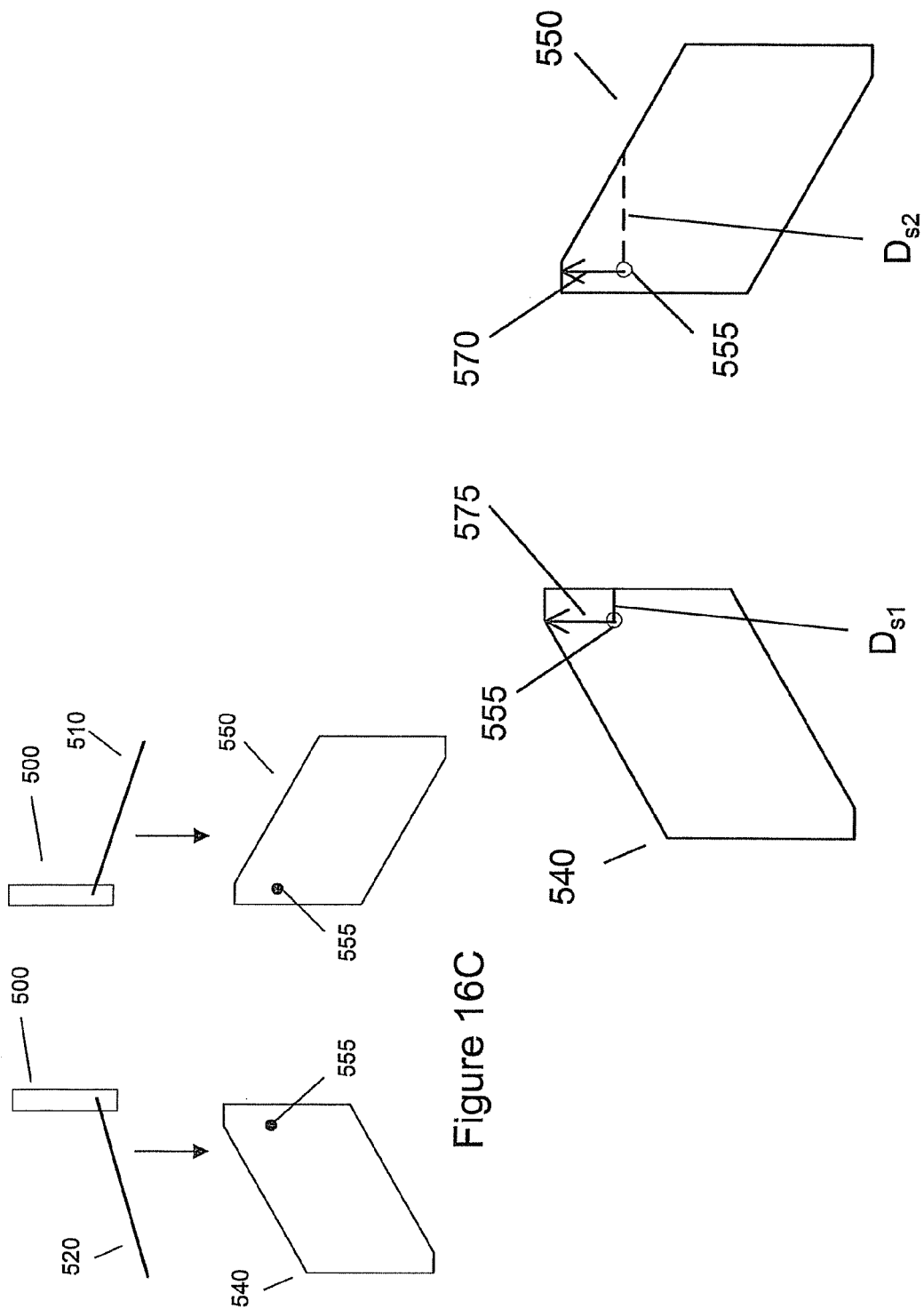

PHYSICS SIMULATION APPARATUS AND METHOD

RELATED APPLICATIONS

This application is a divisional of U.S. application Ser. No. 12/848,759, filed on Aug. 2, 2010, which is a divisional of U.S. application Ser. No. 11/292,788, filed on Dec. 2, 2005, now U.S. Pat. No. 7,788,071, which claims priority to and the benefit of U.S. Provisional Patent Application 60/633,405, filed on Dec. 3, 2004, the entire disclosures of each of which are herein incorporated by reference.

FIELD OF THE INVENTION

The invention relates generally to the field of physics simulation. Specifically, the invention relates to development tools and physics engine components for modeling object interactions.

BACKGROUND OF THE INVENTION

Simulating the interactions between physical objects has been and continues to be important to the military and scientific communities. In the military context, the first computers were used to solve differential equations relating to physical motion in order to calculate missile and artillery trajectories. Similarly, the scientific community has sought to model all manner of force interactions from protein molecule interactions to the aerodynamics of flight. However, such approaches have typically used large mainframes and supercomputers and have generally remained out of the hands of the public. Certainly, the idea of using such models for entertainment purposes was not considered.

Presently, computer and console gaming continue to gain in popularity as major sources of entertainment. As video games and related applications gain in popularity, it is not surprising that new technologies have arisen to provide added realism. In particular, the ability to model gameplay dynamics using relationships based upon Newtonian mechanics is now possible.

Currently, many of these physics modeling approaches are processor-intensive and prone to produce defective simulations and object collisions. This places additional demands on software developers' limited time and resources. In turn, this raises costs to the public and lowers the level of realism in many applications. A need therefore exists for techniques that enable the efficient use of processor time while improving the overall level of realism within a given simulated environment.

SUMMARY OF THE INVENTION

Incorporating a physics engine within a game or other suitable software application places demands on the computational system of the computer or console in exchange for a heightened level of realism. Thus, processing cycles used for animation, sound, graphics or other calculations are exchanged for a dynamic simulation of object interactions. Consequently, some of the aspects of the invention disclosed herein are directed to techniques, systems and implementations wherein complex physical interactions and collisions are modeled at a high level of detail while reducing the computational demands placed on the processing system. In addition, game and application stability is a key design feature. If a physics engine is not stable and game interaction produces crashes, stalls or unexpected outcomes, the overall application suffers. As such, the aspects of this invention disclosed herein offer processing efficiencies and enhanced stability that translate to improved experiences for the user of a particular game or application developed using the techniques and devices disclosed herein.

In one aspect, the invention relates to a physics engine. The disclosed physics engine simulates the motion and interaction of objects based on a physical description of the objects. Geometric, force, velocity, acceleration, mass, momentum, energy and other relationships can be used within the overall engine to generate the simulation. In one embodiment, once the initial conditions for a given scene are established, the main simulation loop is initiated. This loop steps through a prescribed task, updates the graphics and then repeats. Within this loop, the engine determines which, if any, objects are overlapping or about to overlap.

In addition, the engine can use techniques to solve for the motion of the objects using all the forces acting on the objects. Some of these forces might occur as a result of collision between the objects or as a result of input from outside the simulation, such as a user input. Once some or all of the forces are determined, the simulation can be advanced by a time step of a predetermined size and the new state of the objects (position, orientation, velocity, acceleration etc.) calculated for this time in the future. This information is then used to update the display of the corresponding representations of the objects. In some embodiments, the steps are repeated in their individual or collective capacity as appropriate for a given application. In one embodiment, the invention employs a continuous physics approach. As described herein, continuous physics includes the step of performing collision detection continuously or substantially continuously, instead of only checking for collisions at discrete points in time. When using a continuous physics approach, time of impact (TOI) is used. As a result, under a continuous physics simulation any collisions are TOI collisions.

In another aspect, the invention includes the general concept of selecting between continuous physics simulation mode and a discrete physics simulation mode in a physics engine based on one or more physics engine parameters. In one particular implementation, during physics engine operation, when two objects begin to interact, an arbitrary function is called by a component of the engine. The function is arbitrary in the sense that different arguments can be used to select continuous or discrete simulation for a particular object pair. The arguments of the function can include various physics engine parameters such as object type, penetration depth, object pair separation distance, and other parameters described herein. Any combination of physics engine parameters that enable selection of a continuous or discrete type of simulation for a given interaction is within the scope of the invention.

In one aspect, the invention is directed to a physics simulation system that uses a combination of continuous and discrete simulation techniques. In one embodiment, selecting between a continuous and discrete simulation mode is a function of an object parameter, such as an object type. Object types can include debris, fixed, key, bullet, keyframed, moving, critical, and other suitable types defined to facilitate continuous or discrete mode selection. The interaction of two objects, such as a critical object and a bullet object can be evaluated on a per object-pair basis using a set of defined rules. The rules indicate a simulation type based upon the object types for a given object pair. Thus, a critical object and a bullet object interaction may be classified using a define rule such that this object pair is always processed using a continuous simulation. Whereas a debris object and a moving object may be classified using a rule that provides when these object types interact, a discrete simulation is used. The physics simulation system is suitable for developing and inclusion within a game or other software applications. In part, a continuous physics approach offers a high-quality rigid body simulation. This is achieved by considering those events that may occur between two time steps. In some embodiments, the disclosed continuous physics approach enables all collisions to be processed at the exact time of their impact using a (TOI) event list to improve realism and address various time step size and high velocity object problems.

Furthermore, using different stages of collision detection and/or associating different priorities to individual objects allows for a continuous physics approach based upon time of impact calculations to be used as sparingly as possible. However, in other approaches a discrete simulation approach, suitable for physical-synchronous-instance (PSI) collisions, is used to improve overall processing efficiency when appropriate for a given type of object interaction under simulation. During a discrete physics simulation all physical operations are processed at one physical synchronous instance in time.

In one aspect, the disclosed continuous physics approach is based on a motion state representation that contains information from at least two consecutive frames. With that information, the state of simulated objects in-between frames can be determined while performing continuous collision detection. In still further embodiments, the physics engine is used to chronologically process each occurring collision at its exact time of impact (TOI). Thus, a given simulation can always be brought to a physically correct state in the subsequent frame.

Within a physics simulation environment it is generally undesirable for persistent interpenetration of objects to occur. This follows for at least two reasons. First, object penetration can create processing problems and introduce errors within a given modeling environment. Second, for a user, seeing simulated objects overlap can reduce the level of realism and diminish the entertainment experience. Thus, the quality of the physics engine can be directly correlated to the overall quality of the game. Additional details relating to the invention are described in the detailed description of the invention and the aspects and embodiments summarized herein.

In one aspect, the invention relates to a method of simulating a plurality of objects. In particular, the method includes the steps of detecting a collision between a pair of objects, selecting between a continuous simulation mode and a discrete simulation mode for each pair in response to a physics engine parameter and simulating an interaction between the pair of objects using the selected simulation mode. In one embodiment of this method, the physics engine parameter is an object type and the simulation mode is selected by associating an object type with each object in the pair, assigning an interaction type in response to one of the object types, and selecting between a continuous simulation mode and a discrete simulation mode in response to the interaction type. In one embodiment, the object type includes, but is not limited to one of the following: fixed, keyframed, debris, moving, critical, and bullet. In another embodiment, an object type includes any parameter associated with a simulated object that is used by a designer or experienced by a user interacting with a physics engine. Also, the interaction type can include, but is not limited to continuous, discrete, TOI interaction, and PSI interaction.

Additional simulated object interactions as described herein can be used to create and identify additional interaction types. In one embodiment, an allowed penetration distance between objects is set based upon an object parameter. Additionally, a physics engine parameter can include, but is not limited the following: object type, separation distance, penetration distance, object relevance, physical parameters, geometric parameters, and combinations thereof.

In another aspect, the invention relates to a method of simulating object interactions. The method includes defining a first object having a first object type and a second object having a second object type, assigning an interaction type in response to at least one object type, and selecting between a continuous simulation mode and a discrete simulation mode in response to the interaction type. In one embodiment, the object type includes, but is not limited to one of the following: fixed, keyframed, debris, moving, critical, and bullet. In another embodiment, an object type includes any parameter associated with a simulated object that is used by a designer or experienced by a user interacting with a physics engine. Also, the interaction type can include, but is not limited to continuous, discrete, TOI interaction, and PSI interaction.

In yet another aspect, the invention relates to a method of simulating object interactions. Relating a physics simulation process and a graphic display process using a reference timeframe is one step of the method. Additional steps of the method include calculating a first set of motion states for a plurality of objects at a first time, calculating a second set of motion states for the plurality of objects at a second time and displaying a set of the plurality of objects at a third time by interpolating object positions using the first and second motion states. In one embodiment, the method can further include the step of decoupling physics simulation events from graphic display events such that interpolating between time steps adjusts for lag between physics simulation events and graphic display events. Also, the second motion state for an object is calculated from the first motion state and the velocity of the object in one embodiment. Graphic display events and physics simulation events are calculated using separate processes or separate threads in one embodiment.

In still another aspect, the invention relates to a method of simulating object interactions in a physics engine. The method includes the steps of calculating a motion state for a plurality of objects at a first time, calculating a potential motion state for the plurality of objects at a second time, arranging a plurality of times of impact (TOIs) in chronological order, each TOI associated with a pair of objects and a TOI event, processing TOI events sequentially to determine if a collision is valid, generating TOIs in response to valid collisions, and simulating object collisions using a set of valid TOI events. In one embodiment of the method, the first time corresponds to a first frame and the second time corresponds to a second frame. A TOI is calculated between two bodies using a distance interval between the bodies, the interval representing a maximum penetration depth and a maximum separation distance in one embodiment. Additionally, a plurality of TOI events generated from a plurality of colliding objects are solved simultaneously in one embodiment. A maximum penetration distance is increased between a pair of colliding bodies over a number of simulation steps in order to reduce the number of TOIs generated in one embodiment. Also, in another embodiment, a distance interval used to calculate a TOI is chosen from a dispatch table based on an assigned parameter.

In another aspect, the invention relates to method of reducing collision detection processing time. Detecting a collision of a first object and a second object is one step of the method. The method also includes the steps of calculating an impulse, the impulse adapted for changing a velocity associated with the first object or the second object and determining if application of the impulse to the first object results in the first and second objects moving apart at the point of collision. In one embodiment, the invention further includes the step of moving the first object away from the second object by applying the calculated impulse to the first object during the collision. Additionally, the method further includes the step of applying the calculated impulse to the second object during the next PSI time step.

In a further aspect, the invention relates to a method of identifying a potential collision event for two simulated bodies. The method includes the step of calculating an initial separation distance and an initial separation direction between the two bodies. Updating a distance value associated with each body as each body moves and determining if a potential collision event may occur between the two bodies using the distance value, the initial separating distance and the initial separation direction are additional steps in the method. In one embodiment, the distance value is based on linear movement in a direction of the separation distance and an angular movement multiplied by a worst case angular movement multiple. The first body and the second body can differ in size and mass. Typically, the smaller, lighter body receives the impulse if the potential for a collision event is detected. In one embodiment, the method further includes the step of engaging a collision detection system in response to a potential collision event. Also, the method can further include the step of terminating a collision detection system in response to a determination that a potential collision event will not occur for a specified time period.

In a yet another aspect, the invention relates to a method of simulating two convex objects. The method includes the steps of calculating an initial separation distance and an initial separation direction between a corner of the first object and a planar surface of the second object, updating a distance value measured between the corner and the planar surface as one object moves relative to the other object, and determining a potential collision state between the two objects using the distance value, the initial separating distance and the initial separating direction. Additionally, the method can further include the step of tracking a plurality of distance values measured between each corner of the first object and the planar surface of the second object. Thus, if a box or other convex object is rotating towards a planar object, using additional corners and relative distances provides enhanced collision detection. Accordingly, although one corner is rotating away from the surface, another corner may be about to impact the surface. As such, tracking a plurality of convex object points enhances collision detection.

In an additional aspect, the invention relates to a method of calculating contact points between two bodies, each body having one or more convex pieces. The method includes the steps of generating a convex hull for each of the two bodies, calculating a contact point between each of the convex hulls, determining whether the contact point lies on an inner convex portion of both bodies, and if it does, using the contact point for collision detection and if it does not, generating additional contact points. In one embodiment, the determination of whether a contact point lies on the inner convex pieces of both bodies can include the follow steps, determining if the point lies on a child convex piece for each of the two bodies and if the contact point lies on a child convex piece of both bodies, characterizing the contact point as suitable for collision detection.

In a further aspect, the invention relates to a method of determining a separation vector for resolving interpenetration events involving a plurality of objects in a physics engine. The method includes the steps of identifying a first set of interpenetrating objects, identifying a second set of interpenetrating object pairs from the first set, transforming each interpenetrating object pair in the second set into a Minkowski space representation, generating a vector set of candidate separation, vectors for each Minkowski space representation, each candidate separation vector having a magnitude and a direction and selecting the separation vector from all sets of candidate separation vectors, wherein the separation vector selected indicates the direction and magnitude necessary to resolve the interpenetration of the plurality of objects. The separation vector chosen is the vector of smallest magnitude from all sets of candidate separation vectors that can resolve the interpenetration of the plurality of objects in one embodiment. Also, the step of selecting the separation vector is performed by generating subspaces within each Minkowski space representation and overlapping the subspaces to identify a separation vector direction in one embodiment. Furthermore, the subspaces can be generated using a Gilbert-Johnson-Keerthi collision detection-based method.

In yet another aspect, the invention relates to a method of determining a separation vector for a plurality of interpenetrating objects in a physics engine. The method includes the steps of: associating a range of possible expansion directions with one of the objects, reducing the cardinality of a vector set of candidate separation vectors in response to the range of possible expansion directions and resolving an interpenetration state for the plurality of objects using one separation vector. In one embodiment, the method further includes the step of limiting polytope expansion in the range of possible expansion directions associated with an object to improve physics engine processing. Additionally, the range of possible expansion directions includes a single direction such that when a first object collides with a second object, a separation vector for resolving a penetration state is calculated using a depth of penetration in the single direction in one embodiment.

Accordingly, in another aspect, the invention relates to a method of addressing instances when two or more objects overlap or collide in space. In some implementations, this approach is used for convex objects. A convex object typically refers to a two or three-dimensional object wherein any line segment drawn from a point within or on the surface of the object to another point within or on the surface of the object will exist within the boundary of the object. In other embodiments, the teachings of the invention apply to both convex and non-convex objects. In one aspect, the invention's technique addresses the problem of two or more penetrating objects by defining a geometric space representing the union of both objects. This geometric space is a Minkowski sum in one embodiment; however other metric spaces and topological operations can be used in various embodiments.

One aspect of the invention relates to a method of resolving a plurality of overlapping objects in a simulation environment. Specifically, if one or more (n) convex objects penetrate one or more other (m) convex objects, the resulting n*m polytopes are expanded in a Minkowski sum simultaneously to determine the distance and direction of the penetration vector. In turn, the penetration vector provides the distance and direction necessary to resolve one or more of the overlapping objects. In one embodiment, a single direction is chosen in which to expand all underlying polytopes. The next direction for subsequent expansion of the polytopes is chosen by examining all polytopes together, and determining the closest point on the union of the set of polytopes' surface to the origin.

In addition, in some embodiments the shortest distance between the two objects can be found by finding the shortest distance between a point and the surface of the Minkowski sum of both objects. In particular, the invention is directed to solving this problem by modifying the metrics of how to calculate the shortest distance of the point and the Minkowski sum surface.

In another aspect, the invention also relates to methods for colliding two sets of convex objects (or "compound convex objects") typically for the purposes of physical simulation of the objects. To solve this problem, each object of each set is collided with each object of the other set. The invention extends the existing convex-convex collision detection algorithm to work on a set of convex-convex objects in parallel.

Physics simulation is more straightforward with convex objects. However, typically moving objects often are made of a collection of smaller convex pieces. To speed the collision detection code, a virtual convex hull is built around the sub pieces or their children forming the larger object. If the hull is breached, colliding the underlying subpieces of the object is required. In one aspect of the invention, this technique is extended to collide the two objects without actually colliding the convex subpieces. If the convex hull collides at a given point with its environment and the underlying pieces would collide with the environment at the very same point, the sub-pieces are not collided, but rather the outer convex hull is collided. If this is not the case, the simulation collides the object with the individual sub-pieces.

It should be understood that the terms "a," "an," and "the" mean "one or more," unless expressly specified otherwise.

The foregoing, and other features and advantages of the invention, as well as the invention itself, will be more fully understood from the description, drawings, and claims which follow.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. The drawings associated with the disclosure are addressed on an individual basis within the disclosure as they are introduced.

FIG. 1B is a flow diagram depicting various exemplary process steps suitable for use in a physics engine according to an illustrative embodiment of the invention;

FIGS. 3A-D are flow diagrams depicting the decoupling of a graphic display process from a simulation process according to an illustrative embodiment of the invention;

FIGS. 7A-7C are tables illustrating object types, interaction types, and relationships for combining them according to an illustrative embodiment of the invention;

FIGS. 13A-13D are schematic diagrams depicting the use of a convex hull around a group of convex objects according to an illustrative embodiment of the invention;

FIGS. 16A-16F are schematic diagrams depicting object geometries and process steps relating to a modification of an expanding polytope algorithm according to an illustrative embodiment of the invention;

The claimed invention will be more completely understood through the following detailed description, which should be read in conjunction with the attached drawings. In this description, like numbers refer to similar elements within various embodiments of the present invention.

DETAILED DESCRIPTION

Figure 1A:
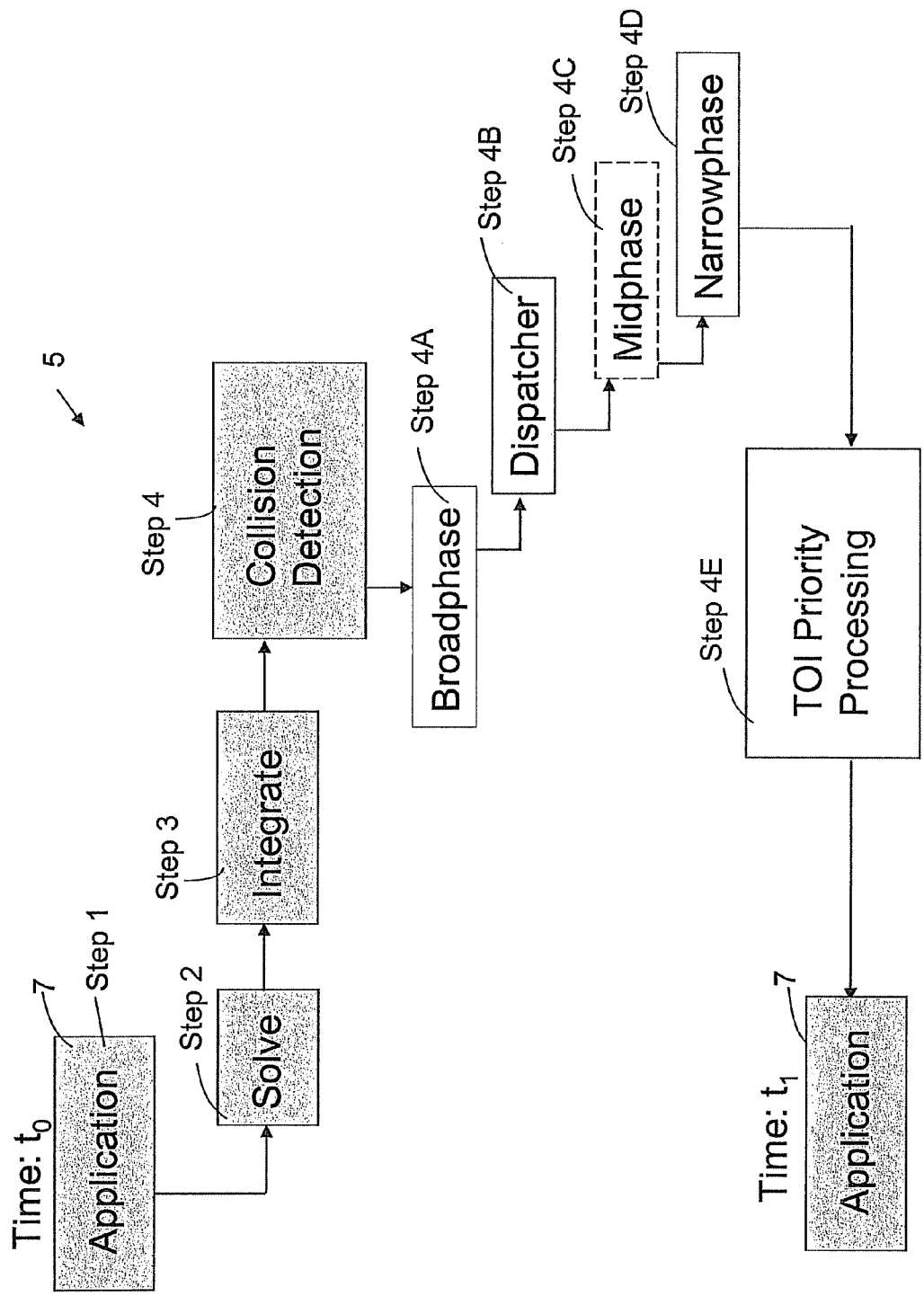
FIG. 1A is a flow diagram depicting the overall operation of a portion of a physics engine according to an illustrative embodiment of the invention.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

It should be understood that the order of the steps of the methods of the invention is immaterial so long as the invention remains operable. Moreover, two or more steps may be conducted simultaneously or in a different order than recited herein unless otherwise specified.

The aspects and embodiments of the invention disclosed herein relate to simulating object interactions such that physical laws are incorporated in the simulation to improve the interaction's level of realism. Typically, the object interactions described herein are incorporated in an entertainment program such as a video game or a movie. The invention relates to various techniques and systems for use within a simulation created using or incorporating a physics engine.

A physics engine is one or more computer programs and/or algorithms that simulate or model the motion of an object under the action of physical laws. A physics engine uses equations incorporating variables such as mass, position information, velocity, forces, engine constraints and others in performing the simulation. As a result, when the engine is used to contribute to a computer animation, inform an artificial intelligence system, and/or respond to a user's input in a video game, various outcomes and events are simulated. This provides a satisfying representation of an interaction in a substantially real or imagined world for a user.

In part, the invention relates to individual techniques and programs that combine to form a software development kit (SDK), that allows designers to incorporate physics simulation within a given design project. However, the individual solutions to particular simulation problems, individual programs, individual algorithms, collision detection techniques, systems for responsively selecting between discrete and continuous simulation, and the other concepts described herein also represent aspects of the invention.

As a result, designers can create a virtual 3D physical world, create physical objects within the world, assign physical properties to those objects, and continuously step the world forward in time to examine the results of the simulation step. Furthermore, using the techniques disclosed herein, designers can customize almost any aspect of the physical behavior during the simulation (e.g. change gravity, apply forces and torques to objects, add and remove objects dynamically). The aspects disclosed herein also provide high level design solutions for game genre-specific problems such as vehicle simulation (for driving games), human ragdolls (for dynamic simulation of killed enemy characters), physical interaction of keyframed characters within a game environment (to simulate enemies getting hit in different parts of their bodies), and character control (for first person or third person games).

Prior to considering the details relating to simulating specific types of interactions, it is necessary to establish a general framework by which a particular physics engine embodiment operates. A general overview of the components of an exemplary physics engine is depicted in FIG. 1A. In addition, FIG. 1B provides additional details relating to an exemplary process flow of a physics engine. In particular, FIGS. 1A and 1B depict a flow diagram 5, 5' that shows how a physics engine creates realistic object interactions. As a result, the engine provides a user with an experience that appears as a continuous simulation and display of game or cinematic events. Typically, simulation and display operations are performed several times a second. Each simulation and display operation occurs during a time step otherwise described herein as a frame. The flow diagrams 5, 5' illustrates some of the steps and stages the physics engine performs in each frame to step a given simulation forward in time. As such, some or all of the steps described in FIGS. 1A and 1B and their associated substeps are repeated as a given simulation progresses.

Referring to FIG. 1A, initially, an instance of the physics engine is generated Step 1 as part of a development project or an application 7 within a particular game. Thus, the physics engine can be implemented using an API, middleware, or other computer software implementation. While the engine is running, during a given frame, the physics engine steps forward in time and simulates any interaction outcomes during the next time step and then output the results for display. At time $t=t_0$, the engine may have already run through different interactions; having been initiated at an earlier time step or time, $t=t_0$ may correspond to the initial start time of the physics engine. However, in either event, method steps 2-4E indicate an exemplary processing cycle of the physics engine between two time steps $t=t_0$ and $t=t_1$ wherein $t_1=t_0+t_W$. $t_W$ is the time step used to advance a particular instance of a world simulated by the physics engine.

At the beginning of each time step, the simulation uses a solver to carry out physics relevant calculations Step 2 based on object information and previously generated or existing data. In part, the solver processes constraints arising from contact manifold information. If the simulation has been running such that objects are interacting or the initial placement of objects results in some objects being in contact, contact manifolds are generated to represent these object relationships. Typically, before the solver operates, a contact manifold has been generated that describes the geometric contact between two or more objects. During simulation, the collision detector, discussed in more detail below; generates contact points between an object pair, such as two rigid bodies. Sometimes several contact points are necessary in order to realistically resolve the collision. As an example, consider a box sitting on a flat surface. In this example, four contact points, one for each corner of the box that is touching the surface are generated. This assembly of contact points is referred to as a "contact manifold."

In one aspect, the solver converts a contact manifold to a constraint. In general, constraints are restrictions on the freedom of movement of objects, allowing the creation of complex systems such as hinges, body joints, and wheels. Constraints are typically used to enrich the dynamic environment and the associated user experience. A constraint between two bodies restricts the movement for a those bodies in a certain way. An unconstrained body has 6 degrees of freedom (3 linear and 3 angular). At any given time, a constraint removes certain degrees of freedom of one body relative to another. For example, if two bodies are constrained by a hinge, all linear degrees of freedom at the point of constraint, and two angular degrees of freedom are removed. As a result, the constraint only allows the bodies to rotate in one axis relative to each other. Such a constraint is bilateral, in that the bodies may not violate the constraint in either direction.

A contact between two bodies can also be treated as a constraint, in that the bodies are constrained such that they may not move towards each other at the point of contact. This type of a constraint is a contact constraint. This results in the effective removal of one linear degree of freedom in the direction of the normal of the contact. Contact constraints are unilateral, in that bodies in contact are only constrained not to move towards each other, movement apart is unconstrained. Additional constraints may be added to simulate friction. In one embodiment, the solver portion of the engine is responsible for taking as input the set of constraints acting on bodies in simulation, the physical properties of the objects, including their linear and angular velocities, and solving the system to produce a new set of linear and angular velocities for the bodies such that all constraints are met.

The solver processes the forces and constraints applied to the relevant objects within the world environment. Any forces and torques specified by a designer are applied to the objects during this stage of the time step, just prior to constraint solving. This enables the constraint solving process to properly take user forces properly into account. Any constraints in the scene are also processed. These can include contact constraints, which are used by the system to prevent objects interpenetrating, and designer specified constraints, such as hinges or ball-and-socket joints between objects.

The solver portion of the engine calculates the necessary changes to reduce error for all constraints in the simulation. In a rigid body system, rigid bodies should not interpenetrate. The depth to which one rigid body is embedded in another, the penetration depth, is a measure of the error in satisfying their contact constraint. Similarly, if, for instance, a pair of objects joined with a ball-and-socket constraint separate, the measure by which they are separated is an error in satisfying that constraint. Errors in satisfying constraints can be counteracted by moving the objects to a new position. The solver calculates necessary changes in velocity in order to bring the objects to the correct positions. The solver deals with all errors of all constraints in the same processing step. In turn, the solver passes the resulting data to an integrator.

The next step in the engine's processing sequence is an integration stage Step 3. The term integration is used to refer to the process of determining the position of simulated bodies at a particular point in time, such as $t_1$. Since differential equations relating physical parameters and changes in position over time are solved by operating on the differential equation, the term integration is used to describe this process. The integrator calculates the new motion state (position, orientation, velocity, acceleration, and other suitable physics engine parameters) for each object in the simulation at the end of the time step. Additional details relating to motion state representations are discussed in more detail below. The integrator operates in response to the information provided by the solver. The new positions and rotations can then be passed on to, for example, an artificial intelligence system or a three-dimensional graphics renderer to update the corresponding in-game objects.

At the beginning of each time step, the simulation determines whether any of the objects in a particular scene are colliding/overlapping. This is accomplished using a collision detection system Step 4. As discussed in more detail below, there are different types of collision types, such as PSI collisions (discrete mode) and TOI collisions (continuous physics mode). The objects that interact with each other are usually resident in a world having differing volumes/environments suitable for the containing objects. Different worlds and volumes are used in the physics engine to contain objects and allow them to collide and otherwise interact.

Collision Detection

The primary focus of the physics engine collision detection system is to calculate all collision information between all bodies in a scene. Within the physics engine, each body is described by position information (motion state) and a pointer to a surface representation related to the object's shape. To perform this task efficiently, the collision detection system uses one or more algorithms to reduce the amount of necessary CPU cycles. The collision detector can also use frame coherency to reduce the CPU load significantly. Specifically, frame coherency allows information about what will occur in the next frame to toggle the level of processing required.

There are a number of ways to speed up the collision detection process. One approach is to reduce the number of collisions that require detailed collision results to be generated, for example by initially using a simpler collision test. A second approach is to reduce the complexity of objects tested for collisions. Unfortunately, creating a realistic game world or cinematic event often requires complex object shapes. Finally, the collision detection system can be adapted to reduce the total number of simultaneously moving objects. Since the number of objects active in a given scene is the primary source of CPU load, if objects can be ignored this significantly speeds up the simulation. As a result, the final approach is often the most beneficial.

Returning to FIG. 1A, two related steps occur in parallel in the process of collision detection. The first, determining a contact manifold, is performed to describe the geometric contact between two or more objects. During simulation, the collision detector generates contact points between an object pair, such as two rigid bodies. Sometimes several contact points are necessary in order to realistically resolve the collision correctly. As an example, consider a box sitting on a flat surface. In this example, four contact points, one for each corner of the box that is touching the surface are generated. This assembly of contact points is referred to as a "contact manifold." The second step is the determination of one or more axis aligned bounding boxes ("AABB"). Typically, the smallest AABB that encloses an object is computed.

As part of this step, an AABB is associated with each object or object group that is resident in one or all of the volumes in the simulated world environment. The AABB describes a volume within which one or more objects reside at a particular moment in time. Changes to AABB and/or the object(s) with it can be used to determine a collision event between objects. The review of overlapping AABB is typically conducted in the early stage of overall collision detection. Additional details relating to collision detection are described in more detail below.

The physics engine system employs a series of collision processing layers, each progressively more complex and returning more detailed results. After each stage, as many objects as possible are eliminated from the test process before moving to the next stage with the resulting data. Specifically, collision detection is divided into three phases or collision detection layers: Broadphase collision detection, Midphase collision detection and Narrowphase collision detection. However, in some implementations only two of the three phases are used. Separating the process of collision detection into different stages allows for more efficient use of processing time.

In different aspects of the invention, the various collision detection phases are used to enhance realism and processing efficiency. Broadphase collision detection Step 4A provides a quick approximation that locates any potentially colliding pairs of objects. In one embodiment, information generated during the Broadphase is passed along to a dispatcher Step 4B. Midphase collision detection conducts a more detailed approximation of potential collisions Step 4C. Narrowphase collision detection determines if any of these objects pairs are actually colliding Step 4D. If the objects are colliding, any intersection information from the Narrowphase can be used later in the time step to generate collision agents and collision contact points. Agents and contact points are used by the simulation solver when updating the simulation. An agent is a specific algorithm designed to process specific interactions. Therefore, a sphere-sphere collision agent or a cylinder-triangle collision agent can be pre-generated as part of the engine to improve processing speed and realism.

Additionally, aspects of the collision detection system are used when a discrete simulation type and a continuous simulation type is selected. This is a function of a parameter associated with an object in some embodiments, such as an object type as processed by the dispatcher and the function(s) it contains. For example, the collision detector calculates time of impact (TOI) events if two fast moving objects are colliding outside the normal physical time step (physical-synchronous-instance "PSI"). In particular, PSI collisions are processed only in PSI steps and do not generate TOI events. In contrast, TOI collisions generate TOI events which are recorded sequentially during a continuous physics mode simulation step. Additional details relating to TOI events and continuous physics simulation are discussed in more detail below.

As a precursor to active collision detection, the initial Broadphase collision detection is implemented using simulation islands. During the physics simulation, separate groups of objects are partitioned into simulation islands. This allows the objects to be simulated independently to enhance performance. In some embodiments, the simulation islands are associated with one or more AABBs. Simulating small groups of objects separately improves CPU and memory utilization. In addition, if all the objects in an island are eligible for deactivation (which occurs when an object has come to a definite halt), the island can be deactivated. As a result of deactivation, further simulation and computational resources are no longer necessary.

Objects share an island if there are certain physical interactions occurring between them. This includes, but is not limited to objects that are potentially colliding according to the collision detection Broadphase, those that are joined together with constraints, and (in some cases) those that are operated on by the same defined actions. Actions enable a designer to control the state of the bodies in the simulation. Actions provide a mechanism to control the behavior of the physical world during a simulation. They can range from a simple action, such an "anti-gravity" action used to make an object float or a more complex action such as an action to control the flight of a helicopter. In one aspect, simulation islands are set up automatically by the simulation system.

Figure 2:
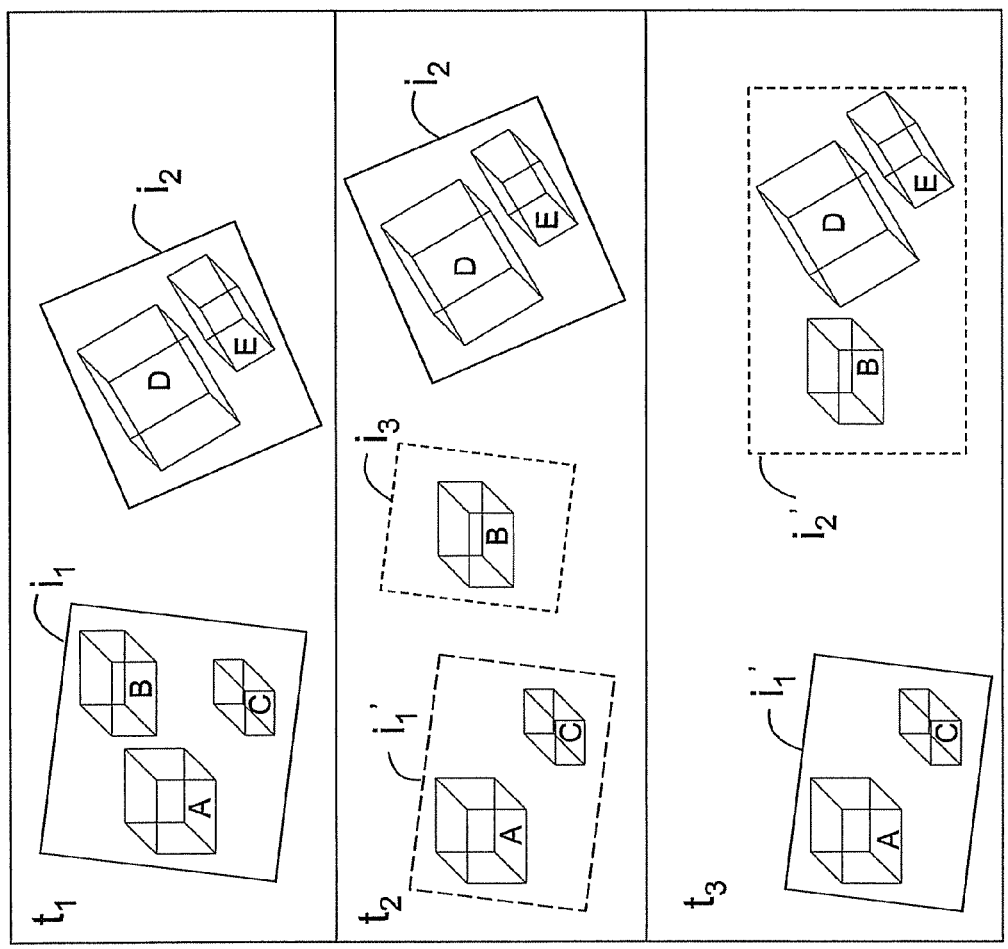
FIG. 2 is a schematic diagram depicting the use of simulation islands at different points in time according to an illustrative embodiment of the invention.

An example of a plurality of simulation islands is described in FIG. 2. As indicated in the diagram, at time $t_1$ there are two inactive simulation islands $i_1$ and $i_2$, each island containing a plurality of objects A, B, C, D, and E. Because the islands are inactive, no object interactions or collisions are occurring. Between time $t_1$ and $t_2$, physical object B is moved into the middle of the two groups $i_1'$ and $i_2$ (which activates islands $i_1'$ and $i_3'$). Active islands are shown by dotted lines in the figure. At time $t_2$, there are three simulation islands, two active $i_1'$, $i_3$ and one inactive one $i_2$. Between time $t_2$ and $t_3$, object B is placed beside the other set of objects D and E, and is automatically added to their simulation island $i_2'$, activating the objects as a result. The other simulation island $i_1'$ is automatically deactivated by the system. The following tasks in the process flow 10 are performed on a per simulation island basis.

Returning to FIG. 1A, as part of the first stage of collision detection (Broadphase) Step 4A, the physics engine use axes aligned bounding boxes (AABBs), boxes that are aligned with the world coordinate system and fully enclose each object. The AABBs enclose each object as the objects traverse their paths from their initial time to their next time of integration, for the purposes of continuous collision detection. The physics engine tests to see if any boxes overlap. This process is a much faster operation than performing full collision testing on arbitrary shapes. To avoid checking all these pairs for exact collisions, the physics engine tries to quickly identify the pairs likely to be colliding in the first phase (the Broadphase).

To do this efficiently, an AABB is generated for every object in the scene. Each AABB contains the entire object at the current position. Then the physics engine only has to find pairs of overlapping AABBs to see if the physics engine has to check any details of this pair in subsequent collision detection phases. If overlaps exist, the collision pairs are passed to the next, more complex collision layer. Even though the physics engine identified possible colliding pairs of objects, this does not necessarily indicate that the objects are actually colliding. Instead, it only signifies that the objects might be colliding in order that the physics engine can pass the information to the next collision detection layer.

Therefore, the Broadphase is conducted to quickly find pairs of AABBs that are intersecting, and thus to identify pairs of objects that require Narrowphase collision detection. In one embodiment, the physics engine's implementation of the Broadphase includes 3-Axis sweep and prune algorithm. The objective of the algorithm is to calculate all AABBs for all objects in a scene or particular simulation island. For each axis (x, y and z), all AABBs are reduced to line segments by projecting the AABB onto each axis. Then the physics engine identifies pairs of overlapping AABBs by looking at their 3 projections. Only if all 3 projections of two AABBs overlap, does the physics engine determine that the AABB are overlapping. As a result, the set of potentially colliding objects is reduced.

In one aspect, the invention includes a dispatcher component or module for performing collision dispatch functions. The dispatcher controls an arbitrary function to select between continuous and discrete physics mode based on one or more physics engine parameters, such as the object types of each body in a particular object pair. However, any parameter associated with an object, the simulated world, the user experiencing a particular game, or generated by a designer creating the game, can serve as the basis for a physics engine parameter. The Broadphase of collision detection relays a list of colliding pairs to the dispatcher. In turn, based on a particular parameter or group of parameters, the dispatcher selects between continuous and discrete simulation mode for one or both of the objects forming the object pair.

The dispatcher can also be used to select the appropriate collision agent (a structure containing a function and some optional cached data) to handle collisions between the objects depending on their particular representation. Thus, different shapes are dispatched to different agents for processing. This improves simulation efficiency. For example, two polytopes can be dispatched to a general convex-convex collision agent, whereas a sphere colliding against a triangle is dispatched to a more specific collision agent that can provide optimized collision processing for these two types of objects. Additionally, if the collision is continuous, the collision dispatcher can use a dispatch table based on the types of the objects to determine the collision quality level, including the maximum penetration depth that should be allowed during collision or other associated parameters. Thus, selecting between continuous or discrete physics mode can be achieved using a relationship between a parameter wherein the interaction is simulated in response to a parameter or information used by a collision dispatcher.

Although not always necessary, more complex tests can be carried out as part of Midphase collision detection to determine if two objects are potentially colliding before finally passing them to the Narrowphase stage. In one embodiment of the physics engine, MOPP (Memory Optimized Partial Polytype) technology is included as a feature of the Midphase layer. MOPP technology is specifically designed to allow large landscapes to be stored with reduced memory overhead. It allows for extremely fast collision detection between moving objects and landscapes. The large landscapes are typically formed using a mesh that includes a plurality of triangles. MOPP as a Midphase layer filtering approach reduces the number of possible collisions between game objects and landscape to the much smaller set of likely collisions between game objects and specific landscape triangles.

As an example, if the physics engine processes rigid bodies about to fall onto a static landscape, the Broadphase will have detected that all of the falling objects are overlapping the AABB of the landscape and all are potentially colliding. The Midphase, using the MOPP approach, reduces the problem by identifying the triangles in the landscape which are likely to be colliding with the falling objects. This reduced set of possible collisions is now suitable for passing to the final collision detection stage, the Narrowphase.

This final phase performs accurate collision tested to determine if objects actually collide. If they do, information about the point of collision, the normal to the objects at the point of collision, and others parameters are calculated. These calculations are often CPU intensive. Therefore, the previous two stages are used to filter the set of objects that are processed at this stage. The physics engine automatically implements collision detection management and can create bounding boxes, MOPPs, etc. for all objects in the simulation in one embodiment. As a result, a designer need not program each collision detection stage.

Since the Broadphase (and/or Midphase) generates a list of potentially colliding pairs of objects, the principal task of the Narrowphase is to check whether and how those pairs of objects are actually colliding. Specifically, an exemplary Narrowphase implementation determines shape information about the rigid bodies selected during one of the earlier phases. The engine then selects an appropriate function, such as a collision agent that can process the shapes associated with the colliding objects. A collision agent can process collisions between two shapes of given types and typically is maintained in memory over multiple frames. The collision agent or other Narrowphase algorithm is then used to generate penetration and collision data.

Each physical object in the simulation has a collision variable, which in turn has a shape variable that defines the object's shape for collision detection purposes. These shapes can range from simple spheres and boxes to more complicated compound shapes and meshes. The collision variable also has transform information, which matches the transform of the corresponding entity in a dynamics subsystem.

In Narrowphase collision detection, collision agents are used to determine if pairs of objects are colliding. Each collision agent implementation processes collision detection for a different combination of shape types. For example, the engine can use an agent that deals with collisions between spheres, another that deals with collisions between transform shapes and other shapes, and so on. The appropriate collision agent for each pair is chosen by a dispatcher based on the type information associated with the colliding objects' shapes and the current set of agents registered by the physics engine.

Typically, the agent is used to maintain a set of contact points for a pair of bodies. The physics engine refers to this set of points as a collision manifold. This manifold is used later by the solver to keep the objects from penetrating. In one embodiment, the collision agent remains active as long as the pair of objects overlaps in the Broadphase.

During the course of the simulation, object pairs are colliding. As a result, impacts and the associated times of impact (TOIs) are being generated. During Midphase and/or Narrowphase, a list of any TOIs is generated. The next step of in the process 7 is to sequentially process the TOIs in chronological order Step 4E. Thus, if multiple TOIs are in a list, the first TOI that is processed is the first TOI that occurred. The processing of this TOI may create new TOIs; these are added into the list in chronological order. When the processing of the TOI is complete, the first TOI in the list is then taken. This is repeated until no TOIs remain in the list. Additional details relating to the processing of TOIs in continuous physics mode is discussed in more detail below.

As FIG. 1A describes a general overview of various steps in an exemplary physics engine according to an aspect of the invention, additional details can be considered in a more specific implementation. Such a detailed embodiment of a simulation process flow 5' is shown in FIG. 1B.

FIG. 1B includes a portion of the steps identified in FIG. 1A with additional specific steps included as appropriate for an exemplary implementation of a physics engine. Initially, a particular program using the physics engine or the physics engine itself, shown as Application 7', simulates object interactions by using a time step to advance a particular instance of the simulated world Step 1a. As a result of stepping the world forward, contact manifolds are determined or existing manifolds are updated/processed. During this stage of processing, it is advantageous to convert contact manifolds to constraints Step 1b. However, in some embodiments this conversion step is not necessary.

Specifically, contact manifolds are typically converted to contact constraints in order to prevent objects from inter-penetrating. Contact constraints can be defined to incorporate allowed separation distance information and allowed object penetration distances as a contact constraint parameter during this stage of the process. During this process, user constraints are also included in the processing. User constraints include user defined system constraints such as ragdoll joints and hinges.

As described in FIG. 1A, a solver is used to process all constraints Step 1c. As a result, as shown in FIG. 1B any changes in velocity due to object interactions or other forces are determined. Next, an integration step is performed Step 1d to determine the position of the bodies for time $t=t_1$ within the simulation world as a result of advancing the time step. Broadphase collision detection is performed using the AABB approach described above Step 1e. The AABBs for the objects are constructed to encompass the path of each object from its initial time at $t=t_0$ to its integrated position at $t=t_1$. As a result of this stage of collision detection, a list of collision pairs is generated as an output. In one embodiment, a collision dispatch module processes the object pairs in combination with one or more physics engine parameters.

As a result, the dispatcher determines how the interaction between the pair of objects will be simulated. Thus, the object types of the two objects that form the interaction pair can be used to select whether their collision or interaction will be continuous or discrete.

The dispatcher generates and uses data relating to pairs of objects that relates to subsequent simulation steps. Thus, the output information may be the selection of a particular collision agent to handle the pairwise interaction of the objects. Alternatively, the output information can include information from a look up table indicating the nature of the interaction of the two objects, for example whether their collision is continuous or discrete. The location of the dispatcher within the process flows 5 and 5' of FIGS. 1A and 1B varies in different embodiments as appropriate.

The resultant object pair information originating from the dispatcher includes a list of the relevant object pairs. This list and any other interaction relevant information are used by the Midphase and or/the Narrowphase collision detection processes Step 1g. In one embodiment, as part of this step, the contact manifold for each object pair is updated and stored for the next step in the process flow.

TOIs from any continuous collisions are also generated during Midphase or Narrowphase. As a result, after performing collision detection on the relevant object pairs an initial list of times of impact is generated. This list is arranged and processed chronologically such that the pair of objects associated with the first TOI is processed first Step 1h. Processing a TOI collision can result in new TOIs being generated and existing TOIs being Invalidated. Invalidation of TOIs happens as objects cease to collide based on the processing of an earlier TOI. During processing of TOIs, information about collisions and TOIs is updated iteratively as necessary. Additional details relating to the TOI processing during continuous physics mode are described in more detail below with respect to FIG. 3E.

Once all of the valid TOIs are processed and no further iteration of steps 1b-1h are necessary, the simulation generates all of the object positions for time t=$t_1$ Step 1i. In the next iteration of the overall process flow 5', the current $t_1$ becomes $t_0$ for the next simulation step. As a result, the process flows depicted in FIGS. 1A and 1B illustrate implementations for simulating continuous and discrete physics that improve processing efficiency while maintaining a desired level of realism for the user.

Referring to FIGS. 1A and 1B, as a result of the performance of the steps shown, any bodies that have come to rest in the simulation become eligible for deactivation. Deactivating a rigid body removes it from the simulation until another interaction or potential collision affects it. As a result, deactivation of objects saves valuable CPU time. Each body has a deactivation setting that informs the overall system when it is appropriate to deactivate the body, based on its state. Also, there is a default deactivator type, such that if all the bodies in a simulation island are eligible for deactivation, the entire island is deactivated. In one embodiment, once a single rigid body is re-activated due to a collision or a user action, all rigid bodies in that island are reactivated.

Having considered an overview of some of the components and steps performed by the physics engine with respect to FIGS. 1A and 1B, additional details relating to the engine's ability to perform various functions are useful. In particular, the details associated with continuous physics simulation and additional details relating to collision detection as they relate to this simulation type warrant further consideration.

Decoupling of Graphic Display Process and Physics Simulation Process

Another aspect of the invention relates to methods for decoupling the graphic display system from the physics simulation process. In one implementation, this decoupling is achieved by interpolating object position using motion states when the physical simulation is not synchronized with the graphic display system. During such asynchronous operation, one advantage of decoupling the two systems is that the information displayed to a game participant is never delayed by the physics processing system. As a result, even when the physics engine lags the display, interpolated information can be provided by the physics system to provide realistic in-game physics.

When using discrete simulation, each body in the simulation contains a single position and a single orientation, which is updated at each time step of the simulation. If 60 simulation steps are taken every second, the time increment for each simulation step is 1/60 of a second long. After each simulation step, the graphics processing step uses the positions and velocities of all the bodies in the simulation and displays them on the screen. If the screen is refreshed 60 times a second, the simulation runs at a rate that is synchronized with the display system.

In contrast, during continuous simulation each body contains two positions and two orientations when evaluated at different simulation times. For example an Object A has an orientation and position at $t_0$ and a second orientation and a second position at $t_1$. This dual endpoint approach to motion state parameters is advantageous when colliding two bodies in a continuous manner. This follows because it is necessary to have two paths through space in order to process a continuous collision.

The simulation time is a global system time, typically set to zero initially, which is incremented as the simulation progresses. The global time functions as a relative timeframe by which the operation of the graphics subsystem and the simulation system can be compared. Thus, the systems can be synchronized with respect to the global time or run independently in a decoupled asynchronous state.

Using motion state information and a global system time, it is possible to remove the synchronized dependency of graphics and physics and to decouple graphics and physics processing. In a discrete simulation, such a decoupling is also possible using the interpolation approach described herein. Decoupling in a discrete system is achieved by using the position and velocity of each object at an initial system time to generate a second position of the object at a new system time.

As part of this decoupling approach, the graphics processing runs as a separate subsystem from the physics engine/simulation processing. Although the two processing systems are separate and can operate in parallel, they operate using a common global system time. However, although a common global time is used, all processing events need not be synchronized to it. For example, the physics and the graphics can run in separate threads and at separate frequencies. An example of this approach is illustrated in FIG. 3A.

Figure 3A:
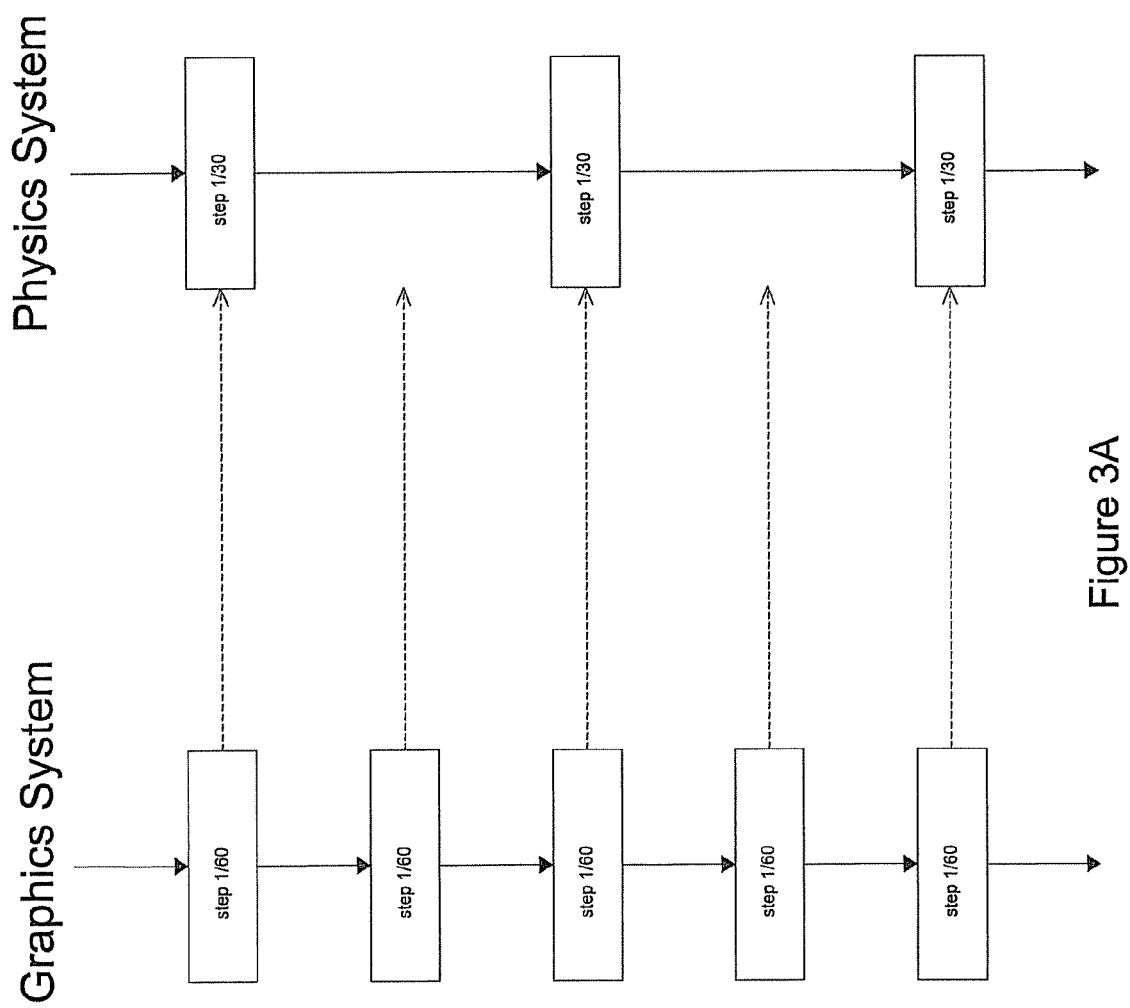

As shown in FIG. 3A, the physics system is running at 30 frames per second (with a timestep of 1/30 seconds), but the graphics system is running at 60 frames per second. The lag between the two separate processes is addressed using an interpolation technique. Thus for every second step the graphics system performs, the physics system interpolates the intermediate positions of the bodies based on their two transforms and relays this interpolated data to the graphics systems.

This interpolation approach is illustrated in FIG. 3B. As depicted, a rigid body $R_B$ is moving and rotating over one timestep with the linear and angular velocities depicted by the solid arrows at time t=2. At the end of this simulation step, the motion state contains two positions and orientations, at the associated times t=1 and t=2. The graphics subsystem may seek to display an intermediate frame at time t=1.5, as this point occurs during the middle of a simulation step. An intermediate frame's display relevant information can be determined by interpolating between the position and orientation at time t=1 and the position and orientation at time t=2 by using a weighted value of 0.5 to interpolate an intermediate position at time t=1.5. The calculation of this weighted time value can be achieved using various interpolation techniques.

For example, a parametric interpolation of two values, A and B, by weight t, where the interpolated value is A(1−t)+ B(t). Thus, for A=1, B=2, t=0.5, the interpolated value that results from this relationship is 1.5. A and B can be any suitable parameter relating to an object simulated using the techniques described herein. To interpolate to a time C relative to two times A and B, t is calculated by (C−A)/(B− A). If C is a time between A and B, t will be between 0 and 1. However, this method also works if C is before A or after B, in which case t will be less than 0 or greater than 1 respectively. The interpolation is typically performed using a linear interpolation of position of the body, and a spherical linear interpolation, or piecewise linear interpolation of the quaternion representing the orientation of the body. The resultant position and orientation of the rigid body is shown as $R_B'$.

Furthermore, the graphics subsystem can be regulated to display an approximation of a physical object, such as a rigid body $R_B$, at a time before t=1 or after t=2, using the same interpolation technique discussed with respect to FIG. 3B. Such an approach is illustrated in FIG. 3C. In FIG. 3C, the motion state positions of a rigid body $R_B$ are shown as well as two interpolated positions of the rigid body $R_{B1}$ and $R_{B2}$. In some instances, an error is introduced by this process because the actual simulated position will not be the same as the interpolated position.

However, this error is often small or undetectable to a user. As a result, if the relevant on-screen time is brief for the interpolated period, the experience of viewing the simulation is not substantially affected. Being able to display objects at a time later than they have been simulated means that the graphics refresh rate is no longer dependent on the physics simulation time. As a result, if the physics processing falls behind the graphics processing, the simulation can still be displayed at a constant framerate. This results in an enhanced experience for the user or participant in the simulation/game.

Figure 3D:
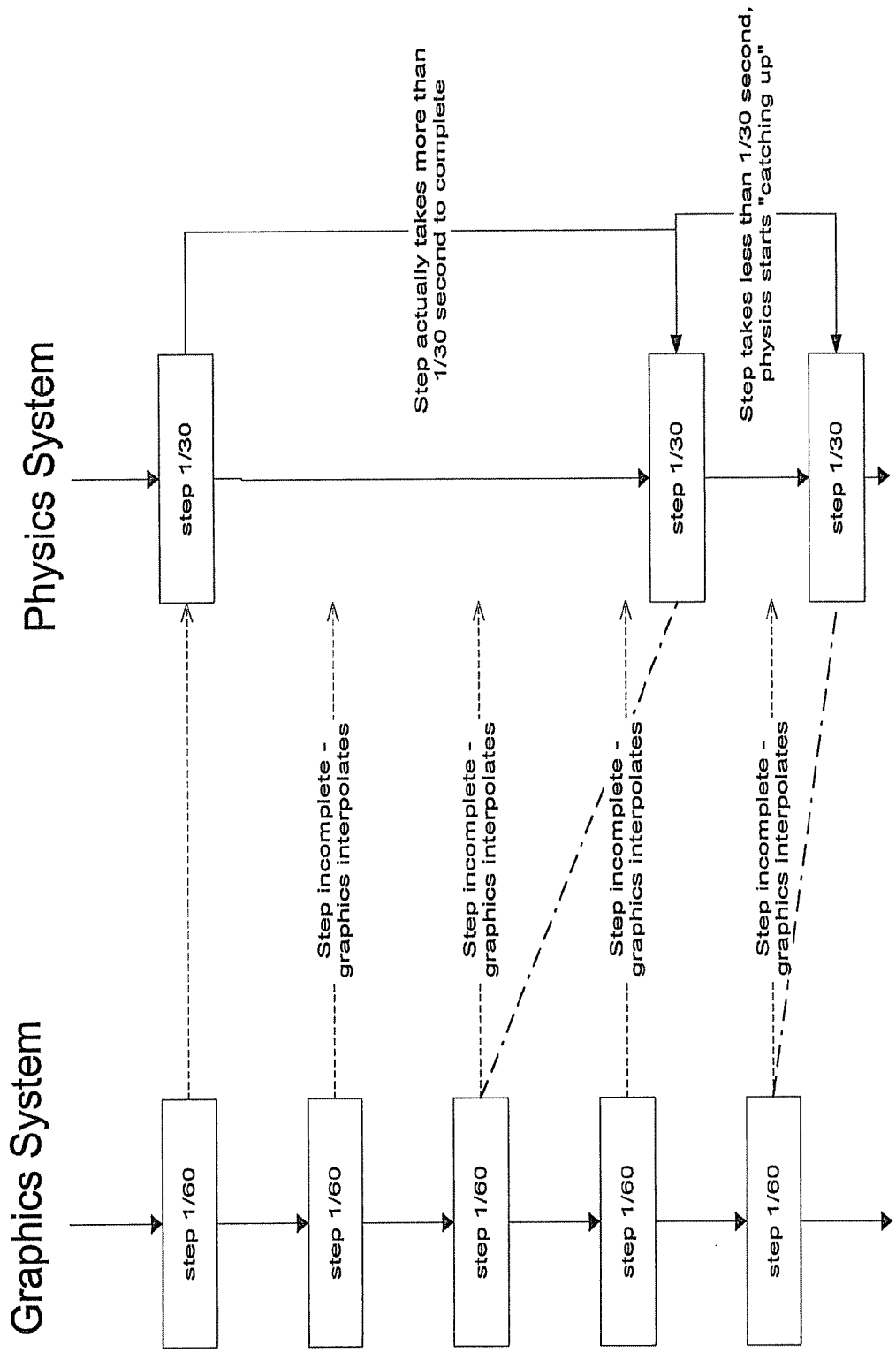

In FIG. 3D graphics processing and physics processing are depicted as running independently, in separate threads or computational processes. In the example shown, a physics step takes more than its allotted time to complete. The physics simulation attempts to run at 30 Hz, but the processing time takes longer than $\frac{1}{30}$ of a second. The graphics can still run at the requested 60 Hz however, by interpolating the transforms of any bodies forward in time to the approximate position at that time. This is possible even if simulation is not complete.

In this example, the global timeframe is used to allow the physics system and the graphic system to track each other even though they are operating at different frequencies. At a later point, the physics may take less than $\frac{1}{30}$ Hz and re-sync with the actual time it is trying to simulate. The user of the system, such as a game designer, may observe that the physics processing has fallen behind real time graphics display in its simulation and take some corrective action (such as removing bodies from the system) to allow the simulation to catch up.

Other techniques that can be used include selectively dropping physics processing steps, and incrementing the global time faster than is actually simulated. For example during 1 actual second of the application running, physics may be stepped only 50 times at $\frac{1}{60}^{th}$ of a second. At the end of this second, however, the physics global time is advanced by $\frac{1}{6}^{th}$ of a second, even though this $\frac{1}{6}^{th}$ of a second was not simulated, due to lack of processing time. Dropping $\frac{1}{6}^{th}$ of a second can be spread out evenly over a period of time. This will create the impression of objects starting move in "slow motion" for a period of time, however the graphics and game will still run at a constant 60 Hz.

The combination of physics/graphic system decoupling and selectively changing the simulation process to re-sync physics processing with display information is one aspect of the invention. However, the general ability to select between continuous and discrete simulation represents another mechanism for enhancing a user's experience of a particular simulation event. Additional details relating to continuous physics are discussed below.

Continuous Physics

Continuous physics, as described herein, provides enhanced rigid body simulation. Rigid body simulation moves objects according to the laws of physics (Newton's laws). In particular, continuous physics mode is adapted to provide improved simulation of fast moving, small objects in a game world. Thus, continuous physics is designed to prevent objects from getting stuck in the game world landscape and stop objects from passing completely through the game world because the object escaped collision detection due to object velocity or time step size. Continuous physics uses a motion state representation, data transforms, and time of impact events to perform collisions tests continuously in four dimensions. As a result, the "bullet-through-paper" problem associated with failed collision detection as a result of time step size and high-velocity game objects eluding detection is addressed using continuous physics mode.

Prior art simulators and the majority of other existing physics engines perform computations based on discrete states. That type of simulation will be referred to hereafter as discrete physics. The majority of other existing physics engines perform computations based only on discrete states. Discrete physics is based on an approach derived from animation movies, such that continuous movement is split into an ordered sequence of frames. Each of the individual frames in isolation does not contain any motion information.

Discrete simulation breaks physical motion into discrete physical time steps. It performs collision detection at those discrete times and employs simple integration methods to advance the state of bodies in time. Therefore, all physical operations are processed at one physical synchronous instance in time (PSI). As a result, collision detection is only based on the relative position of all bodies at each time step in isolation. Collision detection is only based on the relative position of bodies at each step in time. For small or fast objects it is hard to determine continuity between frames, therefore the simulation can easily break in these cases. In some embodiments, object speed, size, and game relevance can be used to establish rules and object type/simulation-type relationships that determine whether a continuous or discrete physics approach is used for a given object.

In a perfect simulation, all objects move continuously and any pair of objects never overlaps. However, due to limited CPU resources, simplifications are made. For instance, object interactions are evaluated using discrete time steps, typically fixed time steps (PSIs). In addition, in some embodiments objects are allowed to penetrate to a prescribed degree. For each penetrating pair of objects, the shortest distance and direction to move one object such that the pair no longer overlaps is calculated. This information is then used to restrict the movement of the objects to stop further penetration and/or to slowly separate the two objects so that they become separated after a given time. Distance, direction and the point of intersection are known at the contact point and have an associated contact normal vector, a contact distance and a contact position, respectively. By simulating the physics at discrete time steps, this contact normal, for example the arrows pointing up from the bottom points of the sphere rolling down the plane, differs from a normal calculated using continuous physics. In discrete physics mode, collisions modeled using PSI time steps and simple integration are PSI collisions.

Thus, if a small ball is moved toward a second ball in discrete time steps, when its position is calculated at the next time step, it may have already deeply penetrated the second ball. In the context of game physics, incorrect collision detection between two single convex objects is not a real problem, because the goal is to solve for visibly plausible physics. However, if there is more than one object involved, an incorrect collision calculation based on a pair-wise object algorithm can lead to unacceptable situations. In these instances, the physics engine in combination with the results of the Broadphase, Midphase, and/or Narrowphase switches to a continuous physics mode based on motion state data and TOI events.

In discrete physics, collision detection is only based on the relative position of bodies at each step in isolation. For small or fast objects it is hard to determine coherency between frames, therefore the simulation can easily break in these cases. Conversely, the continuous physics core is based on motion state representation, which contains information from two consecutive frames. With that information, the physics engine can interpolate the state of simulated bodies in-between frames and perform continuous collision detection. With such precise collision information, the physics engine chronologically, processes each occurring collision at its exact time of impact (TOI). This ultimately brings the simulation to a physically correct state in the following frame.

Figure 3E:
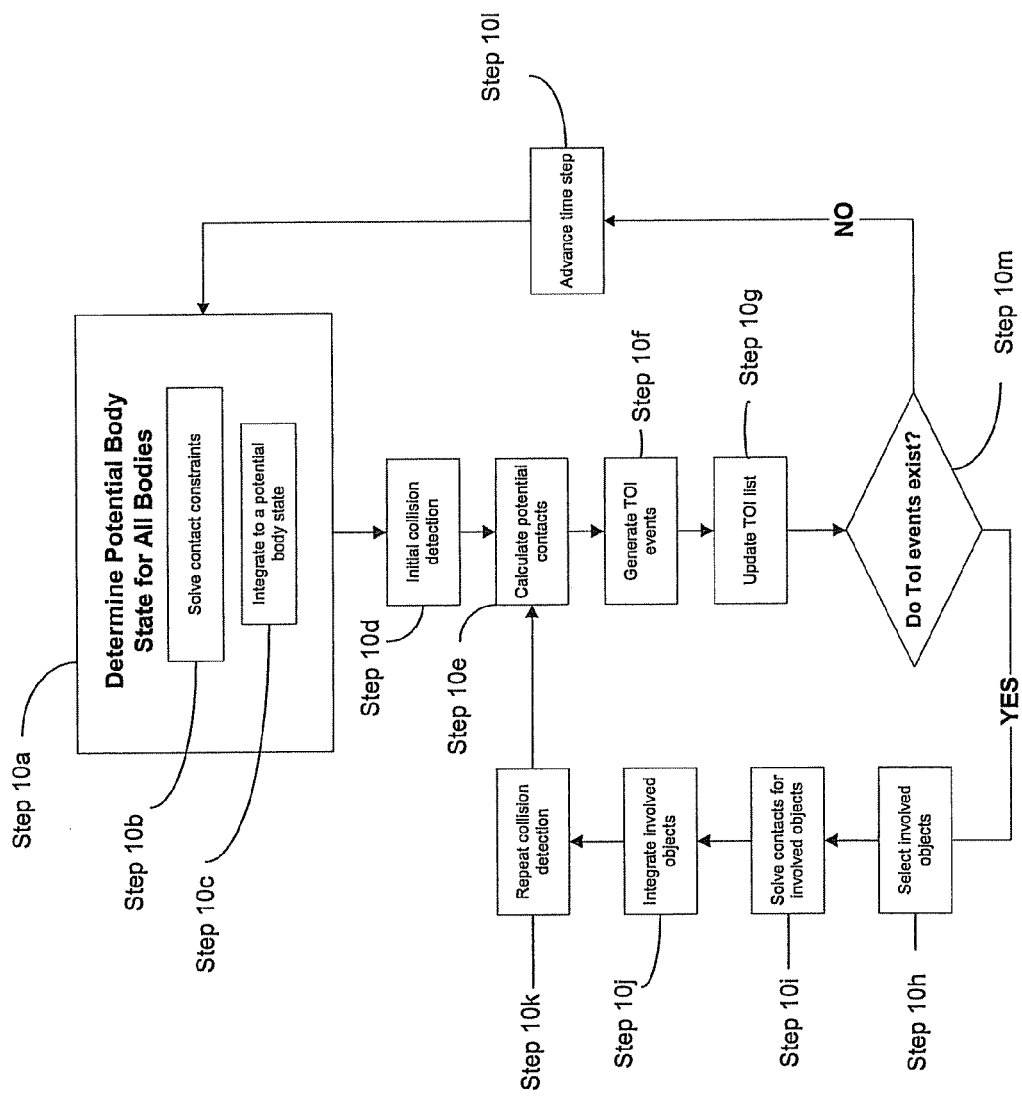
FIG. 3E is a flow diagram depicting exemplary process steps associated with continuous physics mode according to an illustrative embodiment of the invention.

An overview flow diagram of the operation of an exemplary continuous physics simulation process is shown in FIG. 3E. Initially, the physics engine attempts to determine the potential state of all bodies Step 10a. This determination is achieved by solving the contact constraints Step 10b using the solver and integrating to a potential motion state Step 10c as described with respect to the process flow 5 of FIG. 1A. The next step is collision detection Step 10d. As collision detection results in the generation of TOIs during continuous physics mode processing, the next steps in the process, Steps 10e-10k, are repeated as necessary to ensure that all valid TOI collisions are handled by the processor. One collision event can invalidate subsequent downstream collisions and/or cause new collisions having new TOIs to occur. The iterative cycle of processing of valid TOIs chronologically as shown in FIG. 3E improves overall continuous physics mode realism. This cycle begins with collision detection. The initial collision detection Step 10d during runtime begins this process when an object collision is processed using continuous physics.

Collision detection includes the substeps of calculating potential contacts Step 10e and generating TOI events Step 10f. Any TOI events generated are added to a TOI list, in Step 10g. In Step 10g, the TOI events generated are inserted into the TOI list in their correct chronological positions. As new TOIs are generated they may invalidate other TOI events in the list such as, for example, later TOI events involving the same objects involved in the TOIs being added. If no TOI events are present, the time step is advanced, Step 10l and the overall process repeats. However, if TOI events exist, the next step is to select the objects involved in the interaction Step 10h.

Once an initial set of TOIs is generated, they are evaluated chronologically. This involves selecting the objects involved in TOI collision, Step 10h. As described in more detail below, this selection can be a pair of objects, or it can be a larger set of interacting objects, if a group of objects are in contact. The next step is to resolve the collisions by solving the contacts between the selected bodies at each TOI Step 10i. The object integration step is repeated to determine object position information using the integration Step 10j. In addition, the collision detection process is repeated Step 10k in response to the TOI information. This process is repeated until all valid TOIs are processed and no additional TOIs are generated that require simulation. At this point the answer to the decision-making Step 10m is that there are no more TOIs and simulation for the current step is complete. After the repeated iteration of any of the steps identified above, the resultant data is processed by the engine and relayed to the display or other data recipient and the time step of the simulation is advanced Step 10l.

In one embodiment, as described above, continuous physics employs a motion state representation and various data transforms. A motion state is a 6-dimensional representation (3 position and 3 orientation) of a body's position and orientation as it moves through space. In discrete simulation, the physics engine represents object motion state with a vector and a quaternion. These values are integrated from one PSI to the next. In continuous physics mode, the physics engine tracks the body's positions at any moment in-between frames.

Figure 4A:
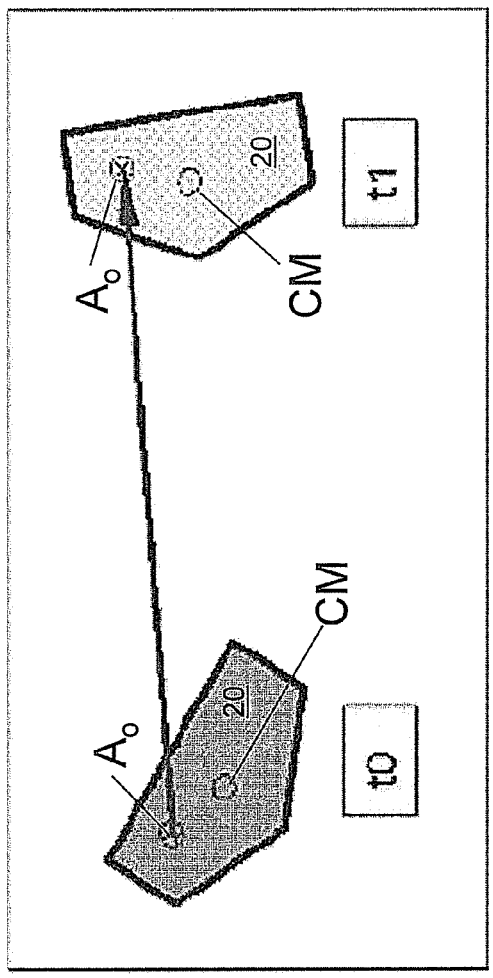
FIGS. 4A-4B depict motion state information processed by a physics engine in continuous physics mode and discrete mode, respectively, according to an illustrative embodiment of the invention.
Figure 4B:
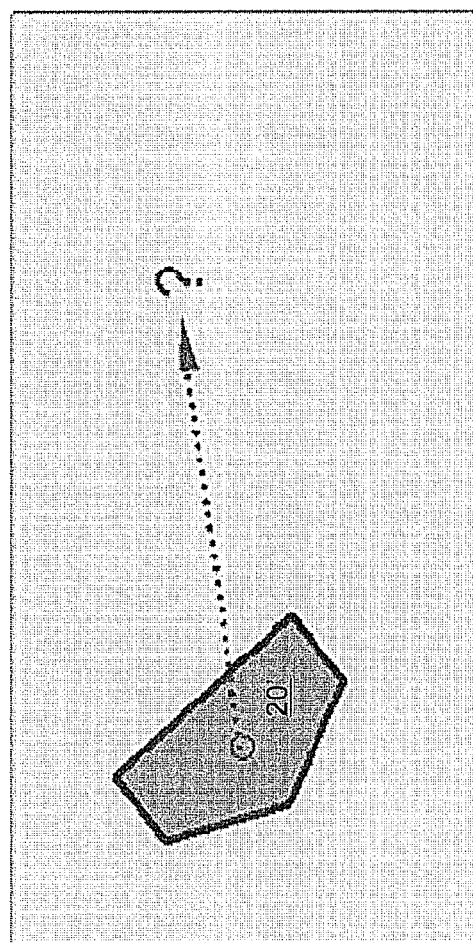

FIG. 4A illustrates the change in motion of an object 20 having a center of mass CM and a surface point $A_o$ after the advancement of one frame from $t_0$ to $t_1$. As discussed above, a motion state is a 6-dimensional representation of a body's position and orientation as it moves through space. In continuous physics, the engine tracks body 20's position at any moment in-between frames. As a result, the rigid motion state is represented by a transform structure that stores the position and orientation of two frames such as shown in FIG. 4A. The transform typically stores information relating $t_0$ to $t_1$ using the increment of the game world's time step; the center of mass position and the body's orientation at $t_0$ to $t_1$; and the center of mass. For the purposes of discrete physics simulation state shown in FIG. 4B, no such transform information or positional data between frames need be maintained for the object 20'. However, it may be maintained for the purposes of asynchronous display of simulation data using interpolation techniques.

Information about the object's 20 center of mass CM allows for proper interpolation of position in time. Specifically, interpolation refers to the notion that although events are simulated at time $t=t_0$ and time $t=t_1$, if the engine is running and an application requests a simulation for time $t=t_{0.5}$, the engine can generate data for this time period based upon the motion state at the two endpoints ($t_0$ and $t_1$). Additional details relating to interpolation are discussed above with respect to graphic system/physics simulation decoupling. In contrast, discrete physics' representation uses position and orientation information from one time moment. Motion state values from consecutive frames are therefore not explicitly linked in any way in discrete mode.

The physics engine uses the center of the mass information rather than simply associating the shape's origin with the mass center of a rigid body. The necessity for that information becomes clear when the physics engine processes shape collections, wherein a number of shapes are associated with one rigid body. Collision detection is performed for each of those shapes in isolation from others, and the physics engine uses the extra CM coordinate to interpolate position properly.

To integrate the motion state, the physics engine uses simple Euler integration. At a normal physical time step (physical-synchronous-instance, PSI) the physics engine assumes that the body has reached its final position at $t_1$. This becomes the initial position of the next time step at $t_0$. After applying all gravity, constraint forces, reaction forces and impulses, the physics engine obtains the body's final velocity in order that the physics engine can calculate its position at $t_1$. This new position is only a predicted or potential final transform, as it may be influenced by further in-between-frame calculations. The collision detector verifies the mutual validity of motion states of all simulated bodies and generates contact points between those bodies at a specified moment in time.

In continuous physics mode, the collision detector receives two transforms associated with each objects' motion state, which overlap in time. The engine interpolates the transform of each of the associated bodies along a time period and checks for conflicts. As the positions of the two bodies are interpolated, the bodies start moving towards each other. The moment when they touch each other is the time of impact and it is reported in as a TOI event. If the physics engine interpolated their positions further, the objects would interpenetrate significantly and eventually pass through completely. When interpenetration of bodies is detected, the collision detector generates a collision event. Such events are called time of impact (TOI) events. They contain the time of reported collision/impact and references to the two colliding bodies. Collision detection is performed for all pairs of objects and ultimately yields a list of collision events. The physics engine includes a TOI-handling loop. This processing loop processes occurring time of impact events chronologically.

When tracking TOI events, there is no longer a need to surround bodies with a large tolerance layer. In prior approaches, a tolerance layer was used to generate contact points prior to an actual surface collision to avoid object penetration in the following frame. In the continuous physics engine described herein, this tolerance layer can be reduced or disabled, as any potential penetrations are prevented at the time of impact (TOI).

Contact points generated by the collision detector are calculated for a given moment in time. This operation is done independently of TOI events. By default, the collision detector yields contact characteristics associated with the final positions of bodies (at time $t_1$). When pairs of objects are found in proximity or in contact at the end of the time step, the engine generates contact points. At that time, the collision detector does not know whether or how any occurring TOI events are going to be processed. As a result, the detector generates contact information, which may be used by a constraint solver in the next integration step (or may be overridden with newer information).

Physical Synchronous Instance (PSI) Step corresponds to a discrete physics engine's simulation time step. The PSI step is responsible for performing a synchronized collision detection and integration for all bodies. The PSI-based approach processes information from one simulation frame only. Given the positions of bodies, it performs collision detection and finds any colliding or overlapping object pairs that need to be corrected. The constraints solver uses that information to apply proper forces to the bodies. Finally, the correct new state is integrated into the system.

In contrast, the continuous physics engine assumes that proper contact information for the current state exists at the beginning of each pass of the simulation loop. Even if this assumption is false, any unacceptable penetrations will be reported via TOI-events before the next frame is reached. The simulation loop runs the solver and integrates the bodies' states first. This yields their predicted or potential final states. Collision detection is responsible for verifying the bodies' movement from their initial to their final state. If there are no interrupting TOI events generated by the collision detector then the predicted state is validated and remains unchanged. Otherwise it may change as additional TOI events are processed.

All TOI events for the entire world are kept on a TOI list or register. The TOI-handling loop processes the events chronologically according to their time of impact. In each TOI-event the motion of some bodies is altered. For those bodies, collision detection is performed again which may result in removal, modification, or addition of some TOI events.

For each collision event interaction, the two colliding bodies are identified and a simple collision response algorithm is used to process the impact in isolation from the rest of the world. Once proper object reaction is calculated, the motion states of the bodies are recalculated. The physics engine sets time $t_0$ to the moment of impact and uses the corresponding interpolated motion state-based transform as the new initial transform at $t_0$. Then the physics engine integrates the state to $t_1$. At this time in the calculations, the physics engine integrates only by a fraction of the original PSI step. In contrast, discrete mode uses PSI steps.

As a result of TOI response, transforms of all bodies terminate at the same moment in time. The termination time corresponds to the next PSI. However, each object's $t_0$ values may differ. Since each processed TOI event has a later or equal time of impact, each processed event happens between the beginning and the end of the transform time (a function of PSI, $t_0$ and $t_1$) of every simulated body.

After altering the motion of bodies according to the calculated collision response, in one embodiment the physics engine performs collision detection again to verify the newly calculated trajectories of the bodies. The physics engine must therefore collide each of the colliding bodies with each other and with the rest of the world's objects. This generates a list of new TOI events, which are inserted in a current list of TOI events for processing. The previously calculated events, which referred to the reintegrated bodies, may now be invalid. Any invalid events are either removed or removed and replaced by the newly calculated events with new time of-impact values.

In certain collision events, only one body in an interacting object pair may ultimately be actually moved by the simulation in response to a TOI. Typically, during the simulation of an object pair interaction, such as a collision, the engine requires that after a TOI the two objects involved are separating. However, sometimes this can be achieved by moving only one of the objects in the pair. As a result, the engine can defer the motion change of the second object until the next PSI. In such an instance, wherein one object can be moved to resolve the collision, solving a TOI is equivalent to calculating the impulse that is applied to each object in collision. Typically, the impulse is equal in magnitude and opposite in direction for the moving and non-moving body. In such instances, the physics engine simply defers the impulse to be applied to the larger of the objects in collision until the next PSI. In such an example, the object whose motion is not changed does not have to be re-checked with the world for new collisions, saving processor time. For example if a car and a football collide at a TOI, the change to the car's motion may be so small that it can be ignored until the next PSI, and only the football's motion is changed at the TOI.

In order to understand TOI processing in the continuous physics mode in more detail, it is useful to consider some examples. Specific examples of object collisions during a continuous physics simulation are illustrated in FIGS. 5A-B and FIGS. 6A-6C. These figures illustrate some aspects of the operation of the collision detector in various situations.

Figure 5A:
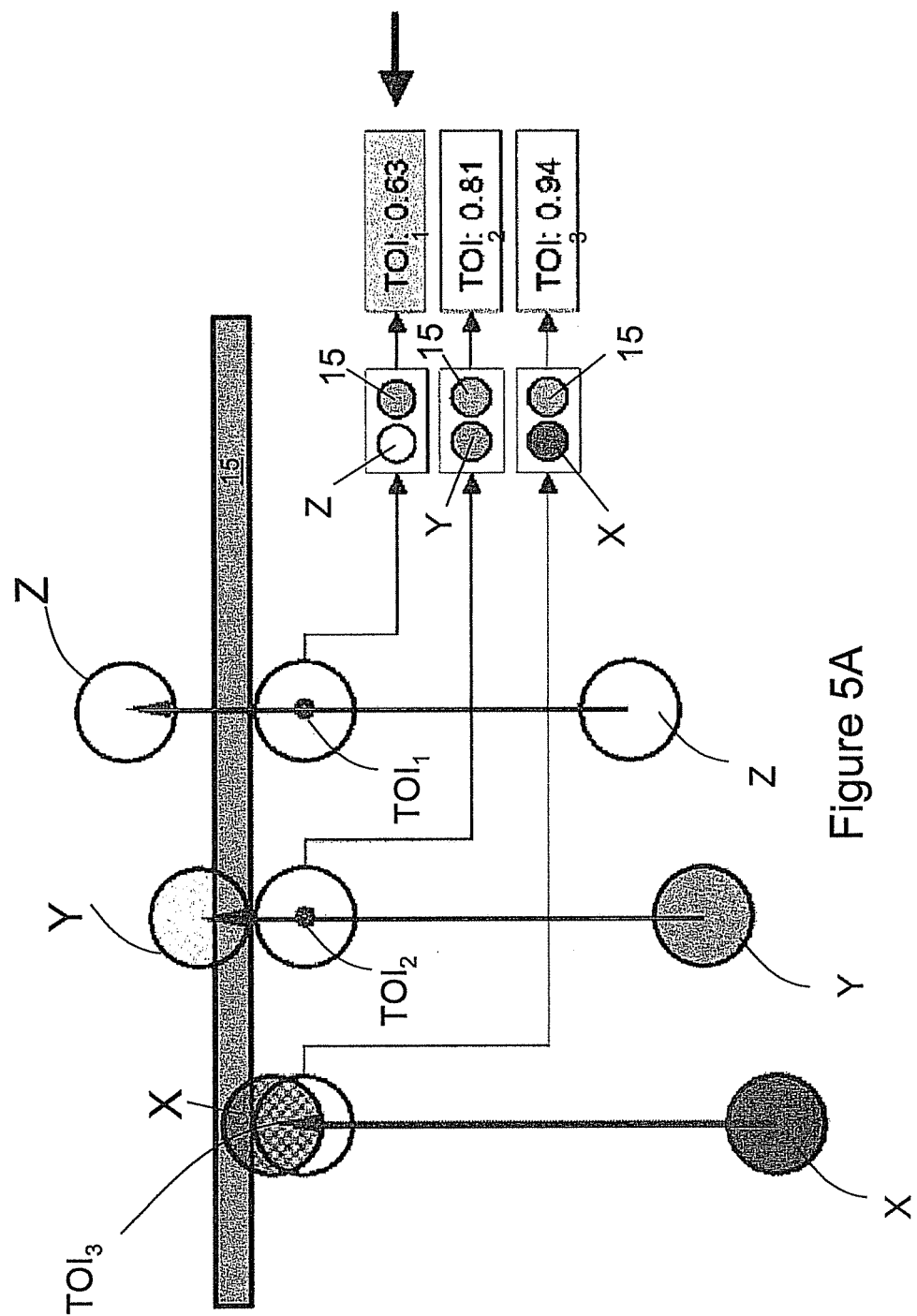
FIGS. 5A-5B are schematic diagrams depicting the object interactions of three independent spheres that generate time of impact events according to an illustrative embodiment of the invention.
Figure 5B:
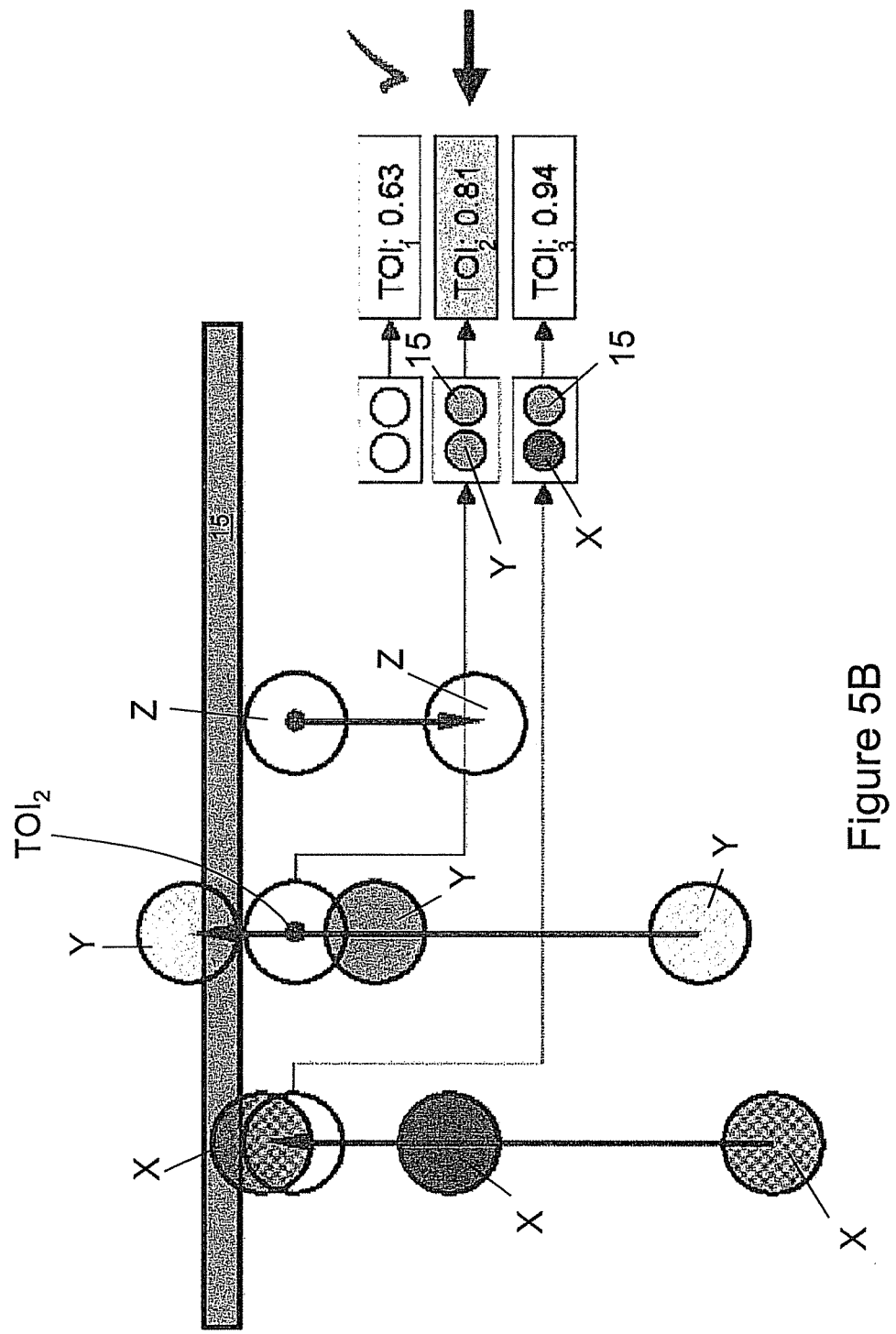

In FIGS. 5A-5B, the independent collisions of three spheres A, B, and C moving in parallel and stationary relative to one another are simulated. In the FIG. 5A, the spheres at the bottom represent position at $t_0$ and the uppermost spheres represent position at $t_1$. All three spheres are moving and about to hit a fixed wall 15. The collision detector determines potential interpenetration and generates a TOI event for each of the spheres (represented by a black ring on the movement path of each of the bodies). Times for each of the TOI events are displayed in the table on the right. The system processes the earliest TOI event first ($TOI_1$), marked by an arrow on the right side.

Turning to FIG. 5B, once the first TOI collision is processed, the rightmost sphere's Z motion is reintegrated and the collision detection is re-run. The collision detector does not return any new TOI events in this example. Therefore, the processed TOI event ($TOI_1$) is taken off the TOI event list. The next TOI ($TOI_2$) associated with sphere B is processed next. The steps of reintegrating and re-running the collision detection process are performed. The same process is used to process the third collision event at $TOI_3$ for the third sphere A.

Figure 6A:
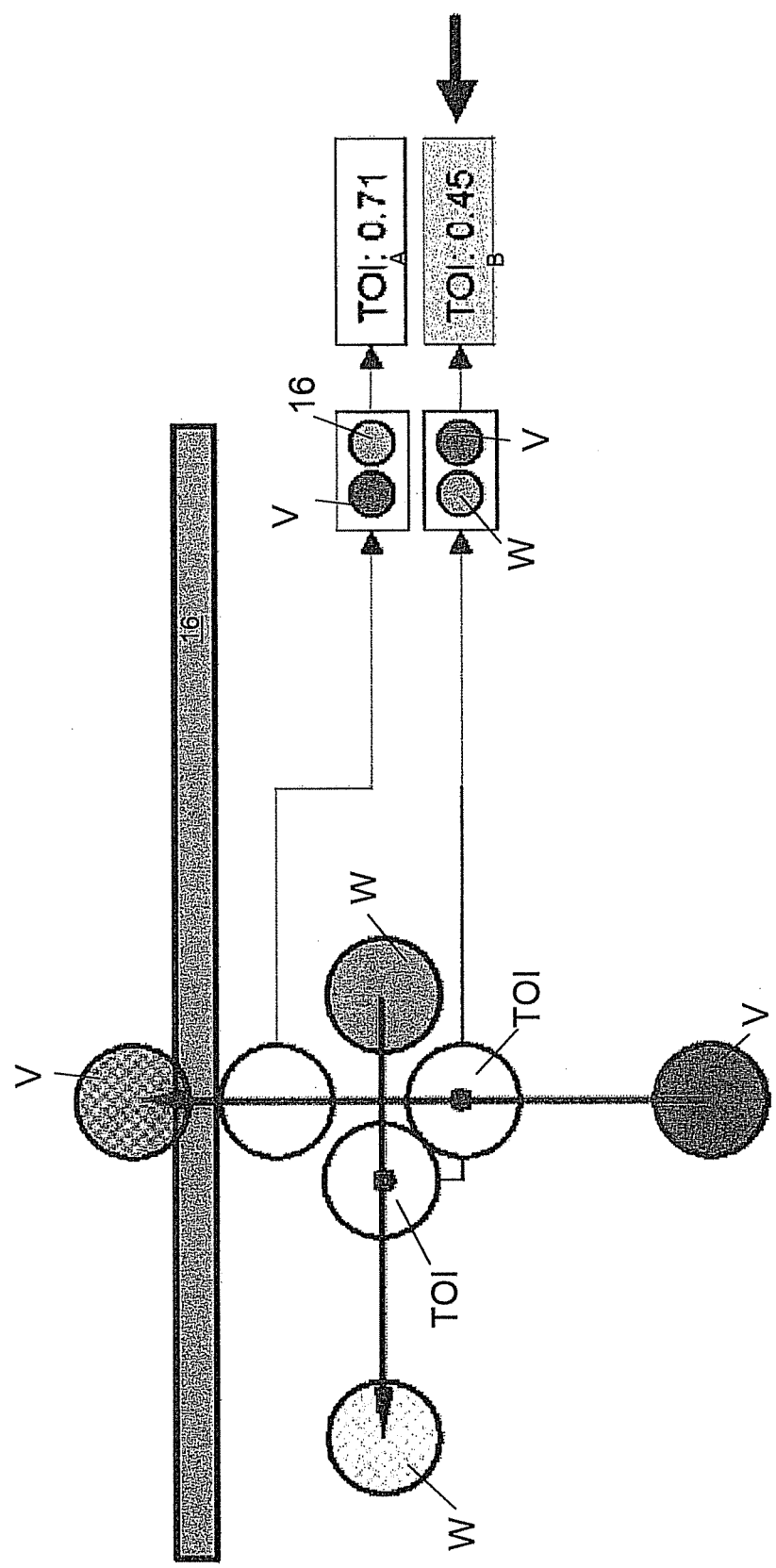
FIGS. 6A-6C are schematic diagrams depicting object interactions of two colliding spheres that generate time of impact events according to an illustrative embodiment of the invention.
Figure 6B:
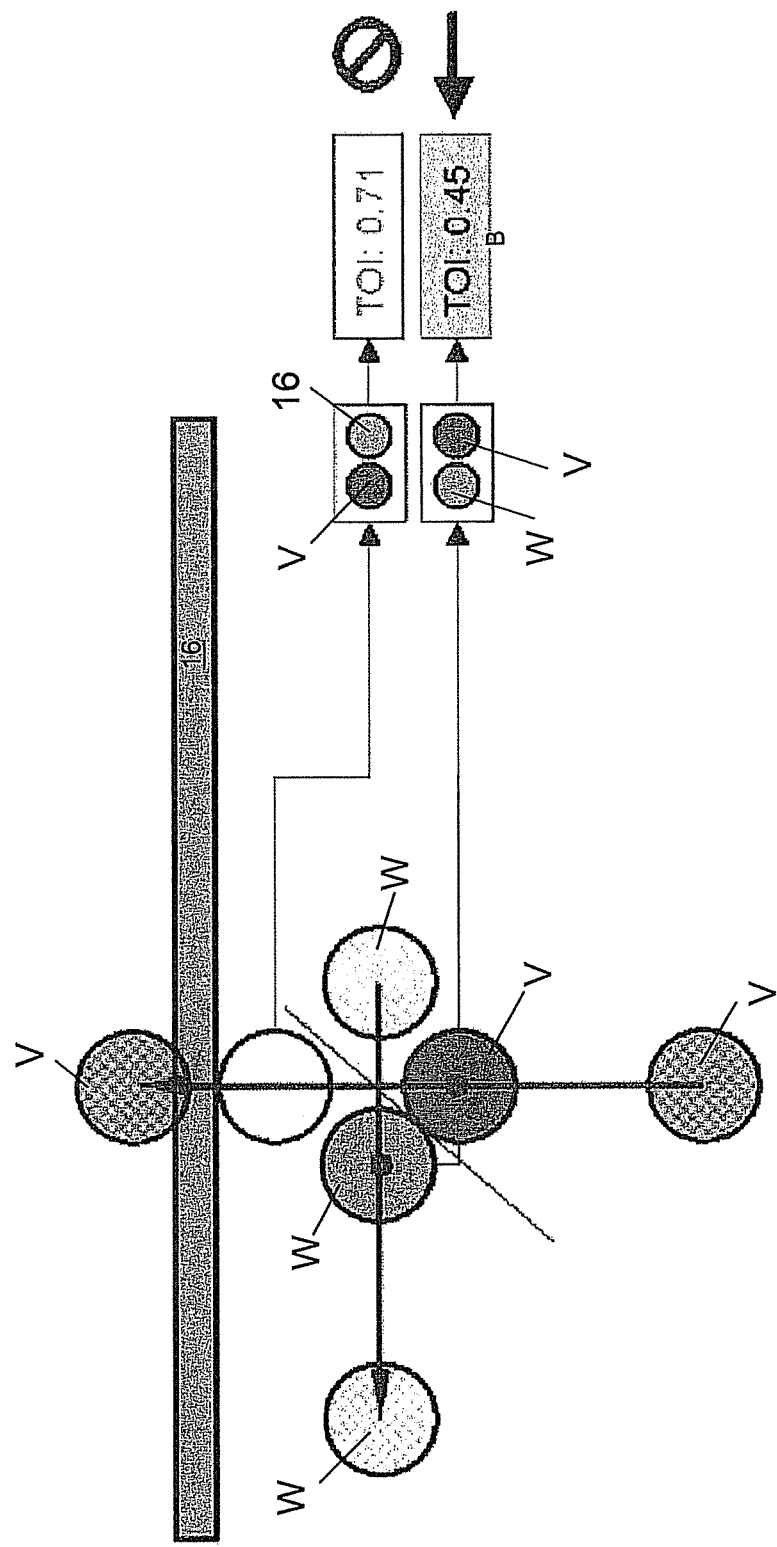
Figure 6C:
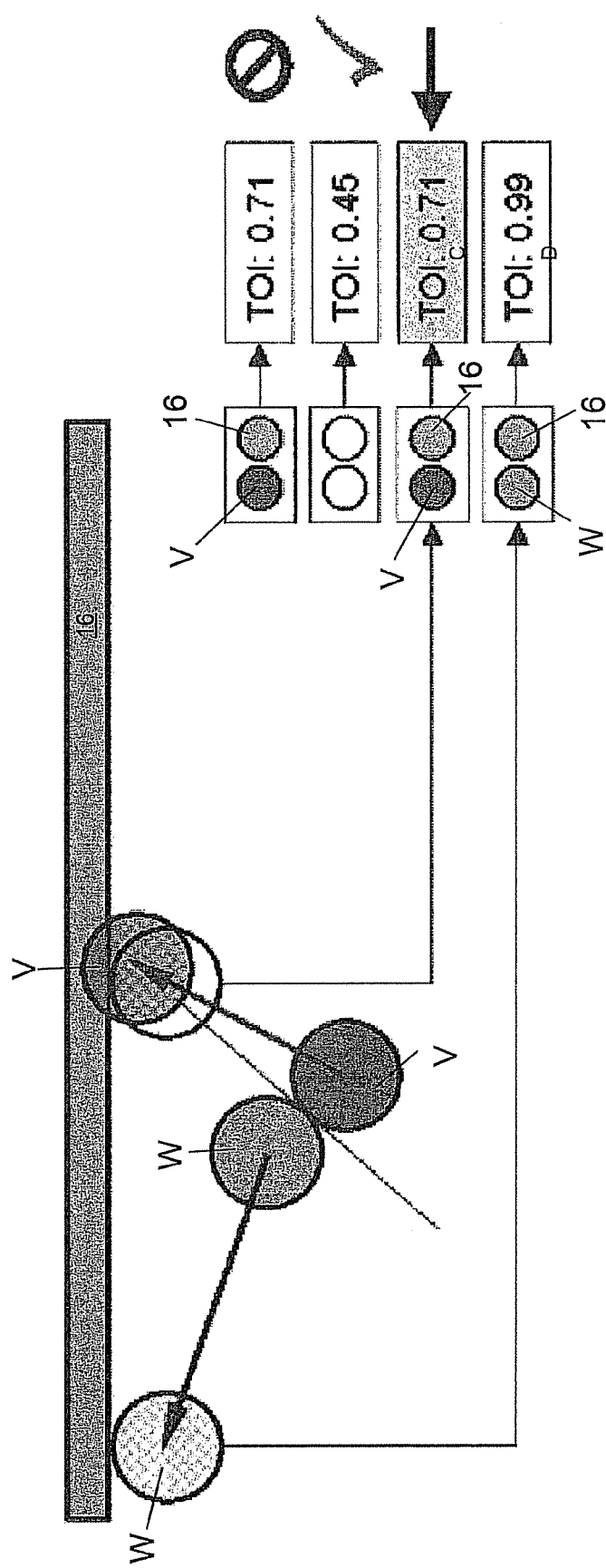

In FIGS. 6A-6C, a continuous physics mode example simulating the different steps associated with two spheres, V and W, colliding is shown. It is noteworthy that the results of the collisions between spheres V and W would be different in a discrete physics approach and a continuous physics approach. Specifically, in a discrete physics simulation (not shown) the collision of sphere V and sphere W is not detected and instead sphere V collides with fixed wall 16 at $TOI_A$. The failure of the discrete approach to detect the collision is a function of the size of the PSI step and object V's velocity.

In contrast, in the continuous physics simulation shown in FIG. 6A, sphere V and sphere W collide at $TOI_B$. Every body may have a number of collision agents active with the other simulated bodies. Therefore, each sphere may generate a TOI event. As a result, one body may end up with a list of multiple TOIs such as a sphere-sphere TOI and a sphere-wall TOI.

As shown in FIG. 6A, the sphere-sphere collision is processed first. Collision characteristics are calculated, and both spherical bodies U, V change in motion. Therefore the TOI-event between the sphere V and the fixed wall 16 is removed from TOI list. In FIG. 6B, collision detection is run with the newly calculated motion state transforms. Each sphere U, V generates a new TOI ($TOI_C$ and $TOI_D$) collision with the fixed wall 16. One TOI event replaces the previously removed one; the other event emerges as a result of the processed collision. After both TOI events are processed, the correct world state for the next PSI is generated as shown by FIG. 6C.

Figure 7C:

FIGS. 7A-7C include tables that provide object categories, interaction types and the exemplary relationships that relate objects and interactions. As shown in FIG. 7A, some of the object types that can be associated with particular in-simulation objects include fixed, keyframed, debris, moving, critical, and bullet. Fixed objects are used for static world elements, especially objects represented by a triangle mesh. Keyframed objects are animated objects with infinite mass. Debris is a low importance object used to improve visual quality in the simulation. Moving objects include regular objects populating the world, such as furniture, etc. Critical objects are gameplay-critical objects that are never allowed to penetrate or leave the game world, such as a key needed to advance to the next level. Finally, bullet objects are objects that are fast-moving projectiles. Associating a particular object type with a given simulated object provides a mechanism for selecting between continuous, discrete and other simulation types when two such objects interact. Simulation types can include continuous, discrete, and ignored, as described herein.

For example, a debris-debris object pair collision can be defined such that this pairwise interaction is always processed using a discrete physics approach. In contrast, a first object having a moving object type colliding with a second object having a keyframed object type may always be processed using a continuous simulation type. The interaction of fixed objects and keyframed objects may simply be ignored by the simulation. Any combination of pairwise object interactions can be accorded a particular simulation type/interaction type by the physics engine. Also, object types can be arbitrarily assigned for a given game to enhance the overall level of realism and to increase the granularity of the range of object relevance. That is, object types can be further classified to include greater ranges of possible types such as debris1, debris2 and bullet1-bullet9, to indicate additional detail for the debris and bullet object type, respectively. In addition to selecting the interaction type for a pair of objects, any parameters for the interaction such as the TOI interval, allowed penetration distance, and allowed separation distance may be set as the result of the types of objects. As a result, the object types described herein are not limiting, but only representative of object types suitable for use with the methods described herein.

A designer may expect critical game play objects (e.g. a key), to have high-priority collisions with the world such that the objects never accidentally sink into ground and become lost. To achieve this, such objects would be classified with as a critical object type. As a result, a pairwise rule that declares that all critical object type interactions with other objects are handled using a continuous approach with TOI collisions may be useful to enhance simulation realism. However, as discussed below with respect to FIG. 7C other interaction rules are possible. Also, a designer may want to allow penetrations between the world and "debris" objects, which only serve the purpose of enriching the visual side of the game, e.g. small car parts flying off a vehicle in a crash. Moreover, a user might still expect those debris objects to interact with bullets a user shoots. As a result, the example categories provided in FIG. 7A allow a designer to tailor an object's role in the game world using its object type.

FIG. 7B describes various exemplary collisions/interactions that are available for processing by the physics engine. In one embodiment, the pairwise interaction of objects selects an interaction type/simulation type based upon object type. FIG. 7B describes various interaction/simulation types. As shown, PSI collisions are processed only in PSI steps and do not generate TOI events. PSI collisions allow interpenetration of objects. In contrast, TOI collisions generate TOI events which are recorded sequentially during a continuous physics mode simulation step such as those generated in FIGS. 5A-5B. TOI HIGHER collisions generate TOI events. For a TOI HIGHER interaction, contact constraints have higher priority in the constraint solver in comparison to a standard TOI event. This prevents interpenetration even when other objects push bodies into each other. TOI FORCED is similar to the TOI HIGHER parameter; however, it includes extra additional checks that are performed when this collision is triggered in a TOI event. As an interaction type/simulation type, ignored indicates that a particular collision is not processed.

Ignored, TOI HIGHER, and TOI FORCED interaction/simulation types are typically used for a moving object and a fixed object, and are not used between two moving objects. Other collision levels generate higher-priority contact constraints. Such constraints are used to prevent game play-critical objects from leaving the game world. For this reason, it is desirable to guarantee no conflicts between higher-priority constraints. According to aspects of the invention, one way to accomplish this is to allow the higher priority constraints only between pairs of fixed and non-fixed objects.

Constraint priorities and the quality of objects control the level of processing resources the physics engine uses for simulating systems of bodies. When simulating a massively populated world, the physics engine can often distinguish between a few critically important objects and numerous other objects that simply add complexity to the world to make it more realistic.

Constraint priorities decide whether and how constraints are processed. In one embodiment of the physics engine there are three priority settings. These include a PSI constraint priority, a TOI constraint priority and a TOI HIGHER constraint priority. These simulation/interaction types can also be used for object pair interactions and are not limited only to constraints. The PSI priority indicates that a particular constraint is only processed during PSI steps. A TOI priority indicates that a particular constraint is only processed during both PSI steps and during TOI events. Finally, a TOI HIGHER constraint priority indicated that the constraint is processed in both in PSI steps and TOI events. As a result, the TOI Higher setting overrides any normal constraints that it conflicts with. As an example, consider a heavy car pushing a hand of a ragdoll into a wall. In this example, for improved realism, the physics engine is configured to simulate the hand to penetrate the car, but not penetrating the wall. Therefore, wall-to-hand priorities are set to TOI HIGHER and the car-to-hand priorities are set to TOI.

TOI constraints add extra quality to continuous simulation. When a body collides in a TOI event, its attached TOI-priority constraints are processed and may affect movement of other linked objects. If the lower quality PSI constraints are used, parts of constrained systems, e.g. ragdolls, may drift apart during TOI events. Constraints are assigned either a normal (PSI/TOI) or a higher priority level. In unsolvable or conflicting cases normal-priority constraints are violated before the high-priority ones.

As described above with respect to the discussion of continuous and discrete physics mode, in a game a designer may want to use different quality settings for different kinds of interactions. As it might be inconvenient to set a quality level for every occurring interaction, the physics engine can be configured to categorize objects into one of six groups according to FIG. 7A in combination with a table containing at least one of an interaction type/simulation type/constraint type such as shown FIG. 7B.

A collision dispatcher is used to determine the collision processing using FIG. 7C for each interaction. The dispatcher is a component of the overall engine that selects simulation type or constraint type based on object type. Typically, the dispatcher selects between continuous and discrete simulation types. This selection typically occurs during Narrowphase collision detection. Thus, to determine how the physics engine will process a particular object type, a rule is associated with the pairwise interaction. The intersection of a particular row (R1-R6) and a particular column (C1-C6) of FIG. 7C provides a representation of various relationships linking interaction types/simulation types and constraint types to particular object types.

For example, in one embodiment, if the physics engine processes the interaction of a first object classified as a moving object type with a second object classified as a critical object type a particular simulation mode/interaction type is selected. The rule for how this interaction is evaluated by the engine is determined by the dispatcher. Specifically, the dispatcher would use information from a look up table such as represented by table 7C. The intersection of the relevant column (moving object type $C_4$,) and the relevant row (critical object type $R_2$), indicates that the resulting object pair collision interaction is a TOT collision that will be processed using continuous physics mode. As a result, object pair interaction generates different simulation types/interaction types or constraint types to improve overall realism and processing efficiency. Additionally details relating to selecting the quality of the interaction are described with respect to FIG. 8.

Figure 8:
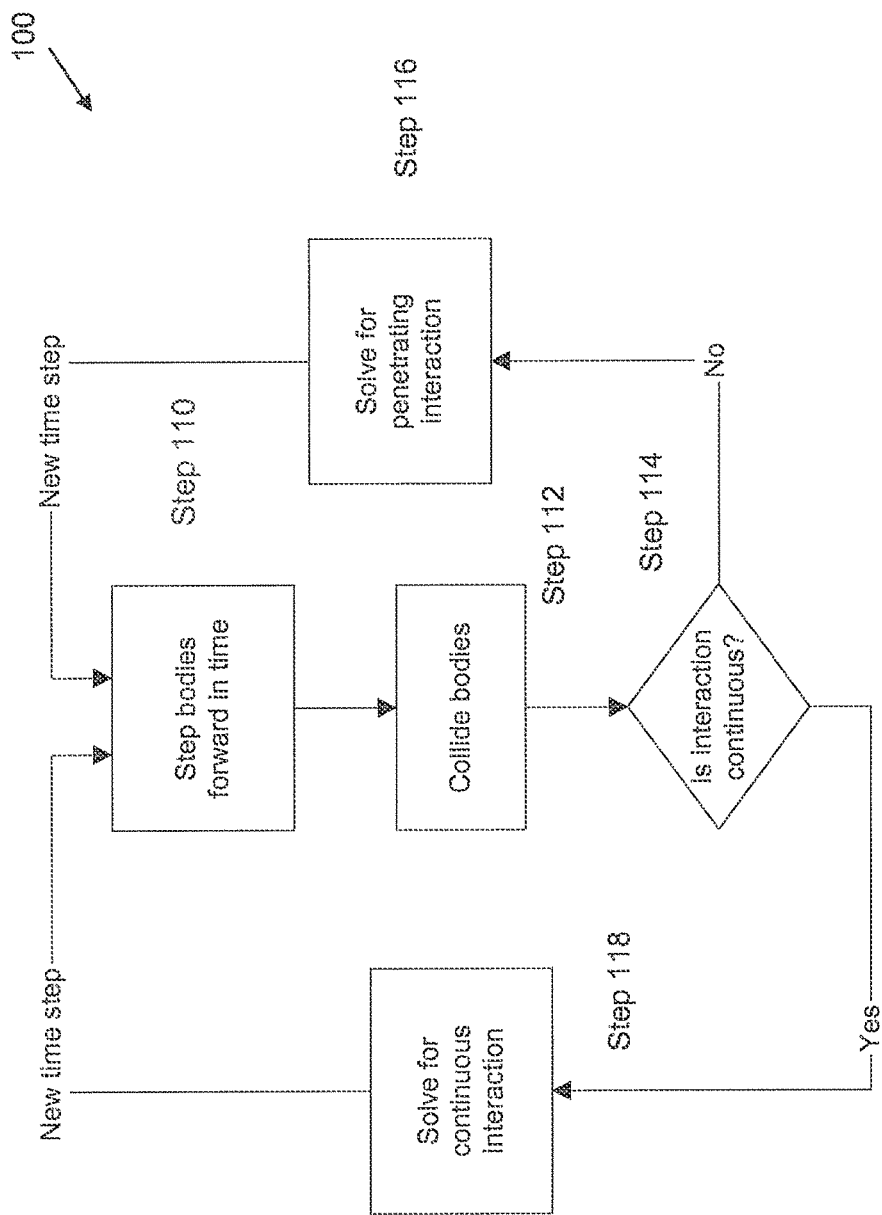
FIG. 8 is a flow diagram of a physical simulation having continuous and non-continuous ("penetrating") simulation elements according to an illustrative embodiment of the invention.

As described above, one aspect of the invention relates to a physical simulation model that combines continuous physical simulation with a penetrating (or "discrete") physics simulation. That is, when two objects in the simulation interact, a decision is made as to what type of interaction they will have. FIG. 8 shows a flow chart 100 of the steps associated with a simple case of two bodies interacting. The decision "is interaction continuous" is made by using a decision table which gives an interaction type (continuous or discrete) for two bodies along with their simulation or object types. Such a table is shown in FIG. 7C. Thus, a fast moving spear (object type: projectile) may be treated using the continuous approach, while a slow rolling isolated drum (object type: moving) may be treated using the discrete portion of the physics engine. Similarly, debris or other low priority objects can be processed using the discrete approach. However, the invention allows a user to switch between continuous and discrete based upon different constraints and parameters. The choice between these two approaches is important because the discrete approach is much less demanding on the processor than the continuous approach. Rather than a specific lookup table, any functional relationship can be used that selects between continuous and discrete physics based on physics engine parameters as defined by a user implementing the physics engine.

Referring to FIG. 8, the algorithm first steps the bodies forward in time (step 110) until the bodies collide (Step 112). At this point a decision is made as to whether the interaction is continuous or discrete (Step 114). If the interaction is discrete the program then treats the interaction as a penetrating interaction (Step 116) before implementing a new time step. "Solve for penetrating interaction" means that the bodies are simply evaluated at the end of the time step using penetrating collision detection. The physics engine can include rules specifying how impulse forces are applied to interpenetrating objects such that they separate in subsequent time steps.

If the interaction is not discrete, the algorithm treats the interaction as continuous (Step 118). "Solve for continuous interaction" means that the bodies are evaluated along their paths through the time step using continuous collision detection. A non-penetration constraint is solved for the bodies at the point of collision. In one embodiment, all interactions assigned in this manner are considered together, because continuous interactions will frequently interfere with each other.

Figure 9:
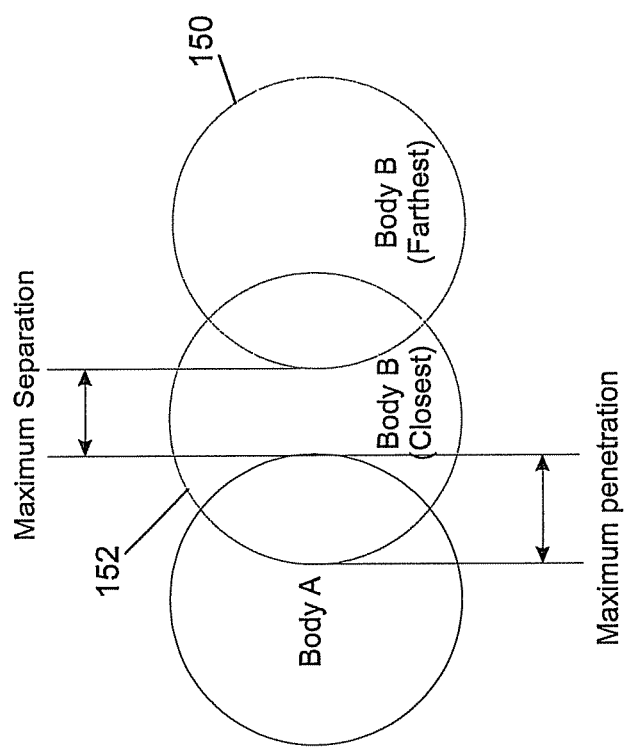
FIG. 9 is a schematic diagram depicting the time of impact distance interval according to an illustrative embodiment of the invention.

The engine solves for a continuous interaction by determining a time of impact (TOI), for the two bodies undergoing collision. This TOI may be generated at a distance interval, called the "TOI interval," which it measures from a maximum separation distance to a maximum penetration distance between the two bodies. Referring to FIG. 9, a TOI interval is generated between body A and body B when body B moves between position 150 and 152 of body B (or any position in between). The maximum separation and the maximum penetration levels are decided on a per body pair basis.

For each pair of objects involved in a continuous or penetrating (discrete) interaction, information on their separation (for example a separating normal and separating distance) is stored. After the bodies have been stepped forward in time, the system examines their movement and determines whether they could have collided. This information is used to avoid further collision detection calculations for this step. Each time the bodies are moved, this separation information is updated.

Figure 10B:
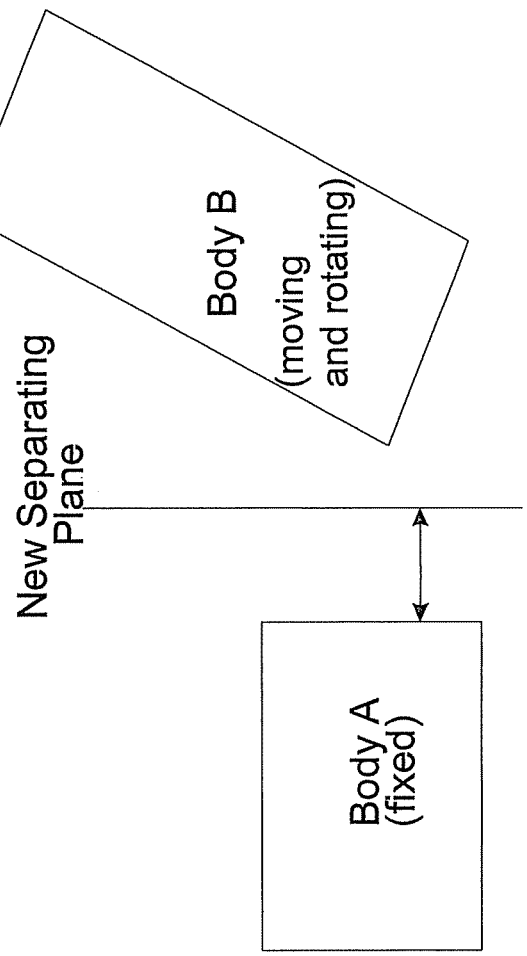
FIG. 10B is a schematic diagram depicting a process for updating the separation plane due to the motion of one body of FIG. 10A to a second body according to an embodiment of the invention.
Figure 10A:
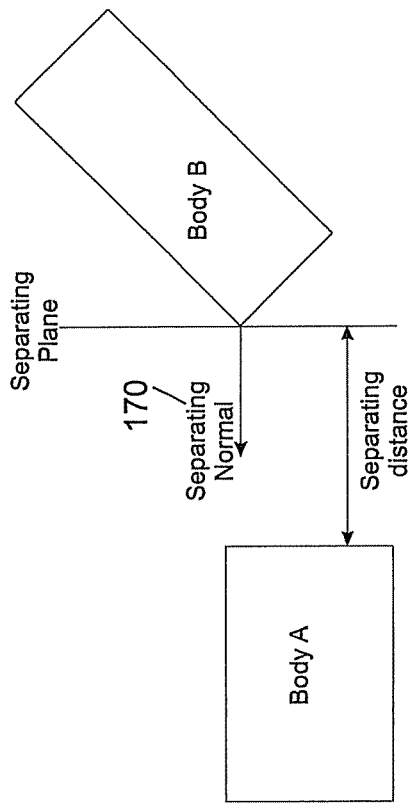
FIG. 10A is a schematic diagram depicting the separating plane of a collision of a body with a second body according to an embodiment of the invention.

In addition, a separating normal and a separating distance are included in the separation information for two convex bodies. That is, both a vector and a distance are used. Referring to FIG. 10A, to determine whether a pair has collided, their linear movements in the direction of the separating normal 170 are added to the worst-case rotational movement of the object. This is based on the angular velocity, the time step and the furthest extremity on each object from the center of mass.

If this worst case value summation is greater than the separating distance, collision has occurred. If not, the separation information is updated by subtracting this value from the separating distance, and further collision detection is not performed at this step. This is illustrated in FIG. 10B, where body B has moved and rotated during a time step. The separating distance is reduced by both the linear movement and the worst-case angular movement. This produces a new separating plane that is closer than the actual separating plane, but is conservative, in that no rotation of equal magnitude could have caused any part of body B to breach the new separating plane.

As discussed above, information for pairs of objects involved in continuous interaction is used to avoid calculating new TOIs when the objects are in contact. These objects are allowed to penetrate by a certain amount. The verification on the separation distance makes sure the objects do not exceed this penetration. For these objects, collision detection is evaluated at the end of the time step, and solved for objects involved in penetrating interactions.

When two objects are involved in a continuous interaction, the "maximum penetration" value and the "maximum separation" value are modified for the pair as the simulation progresses. Thus, if a bullet and a table are going to interact, the penetration and separation values can be adjusted such that the bullet will either enter the table or ricochet at a particular angle. In addition, the physics engine can specifically add an incremental penetration depth from one time step to the next to reduce the number of TOIs generated in the interaction. Thus, as the allowed penetration increases, the number of impact events drop.

Furthermore, when solving for multiple continuously interacting pairs that interfere with each other, the TOI interval is used to deal simultaneously with many TOIs, rather than generating each TOI exactly and dealing with them independently. Thus, if a tank is going to roll over a light ball, in order to prevent a nearly unlimited number of TOIs when the ball bounces between the tank and the ground, the entire landscape, ball, and tank object set can be treated as one entity dealt with at one point in time. In some instances, TOIs can be generated using an improved version of conservative advancement that allows for larger time steps in some situations. Thus, if objects will not collide for a longer period of time, longer time steps can be used to delay continuous physics processor time.

Figure 11:
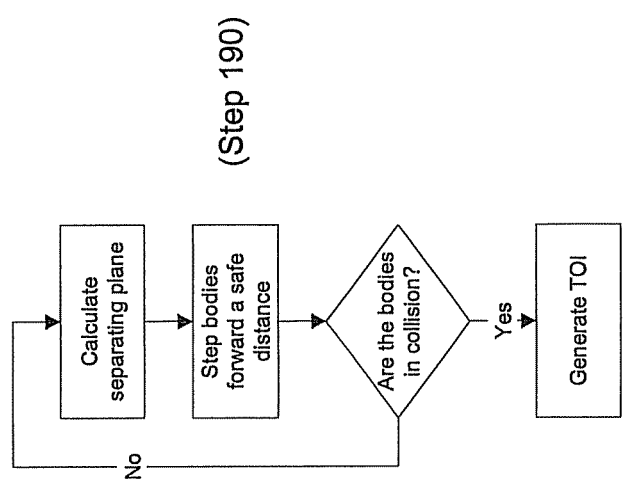
FIG. 11 is a flow diagram depicting an enhanced version of the conservative advancement algorithm according to an illustrative embodiment of the invention.

Referring to FIG. 11, to step the bodies forward a safe distance (step 190), the linear and angular velocities (as described in the worst case scenario approach) are used to generate a conservative upper bound of movement. However, when two objects are very close, or in contact, to improve on this calculation, all the points on one object are considered against the separating plane of the other object.

Figure 12:
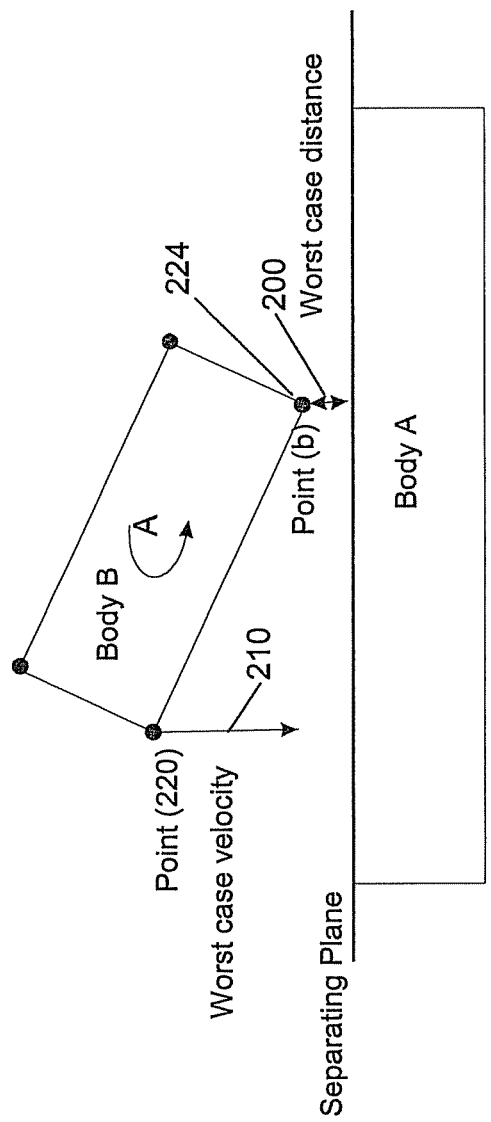
FIG. 12 is a schematic diagram depicting the collision of a box with a surface according to an illustrative embodiment of the invention.

Referring also to FIG. 12, body B is rotating quickly in the anticlockwise direction (arrow A). The worst-case distance 200 is very small and the worst case velocity very high 210. As a result, typical schemes only step a small distance. However by evaluating the collision point by point, the velocity, distance and worst case acceleration for each point can be considered. Point 220 has a high approaching velocity, and also a large distance from the separating plane, for point 224 has a small distance from the separating plane, but also a small (or possibly negative) approaching velocity. This allows larger steps forward to be taken and reduces costly processing time.

Figure 13C:
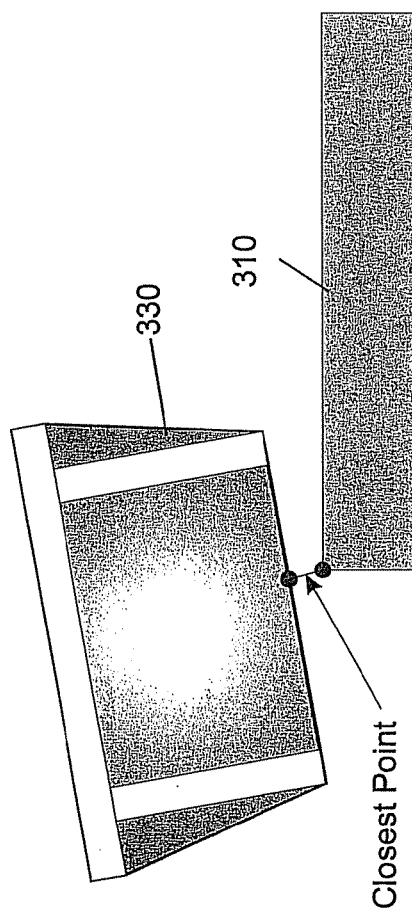

The invention also teaches methods for colliding two sets of convex objects (or "compound convex objects"). In one aspect, this is referred to as the recursive convex object method, but other algorithms to determine the closest points between two convex objects are available. When compound convex objects interact, typically all the individual pairs of the object's convex children are considered. Referring to FIG. 13A, a table 300 which is a compound convex object, is shown colliding with a convex floor box 310. The arrows show the individual pairs of "child" convex objects that are tested in collision. Thus, as shown, table 300 has three convex object children. Each interaction of one of the children with the box 310 constitutes an interaction pair.

The three interactions shown in FIG. 13A between the children of table 300 and body 310 can be processed in an improved fashion using the recursive approach of the invention. Specifically, as shown in FIG. 13B for the compound convex body, a convex hull 330 about the child convex pieces is generated. The hull represents the outer boundary of the collection of convex objects such that the hull acts as the boundary for one object with specific surface contact points.

For multiple compound convex bodies, the simulation is then used to collide these convex hulls together, either continuously through time steps or by the discrete physics approach. If the hulls are penetrating, the algorithm reverts to colliding the child convex pieces against each other. However, if the hulls are disjoint, that is not in contact, the closest point between these two hulls is calculated. One embodiment of the invention extends this approach to examine the type of the collision between the convex hull and the other object and actually collide with the convex hull instead of colliding the children (FIG. 13B).

Figure 13D:
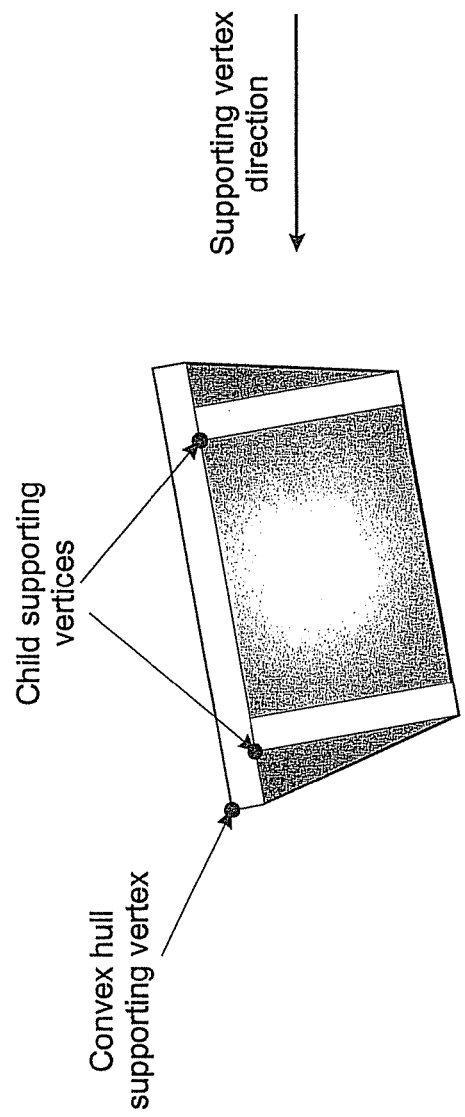

This collision is done by testing if the closest point between the convex hull 330 and the other object 310 lies on the surface of any convex child of each compound body. If it does, this point is accepted, and no further work performed. If it does not, the usual child-child convex check is continued. The closest point of the convex hulls clearly lies on the surface of the child shape. Conversely, in FIG. 13C the closest point between the hulls lies in "mid air", and so the program continues to test the children for collisions. Mid-air corresponds to a region of the hull wherein no portion of a convex child is present. The aspect of the invention that iteratively checks these conditions illustrates the recursive nature of this approach. Moreover, a collection of convex objects can be processed as a single convex object for collision detection as shown in FIG. 13D. This is done by querying each sub-object for its relevant collision information and selecting or merging the information from all children.

To decide quickly whether a collision between an object and the convex hull around a set of convex sub pieces will occur the following method is used. Each convex sub piece receives a unique id. If an object collides with the convex hull, the type of contact is considered. Each contact has a number of this contact supporting vertices (e.g. point-triangle). If all supporting vertices belong to the same sub-piece, a real collision with the convex hull of the set of objects occurs, otherwise it does not.

Figure 14:
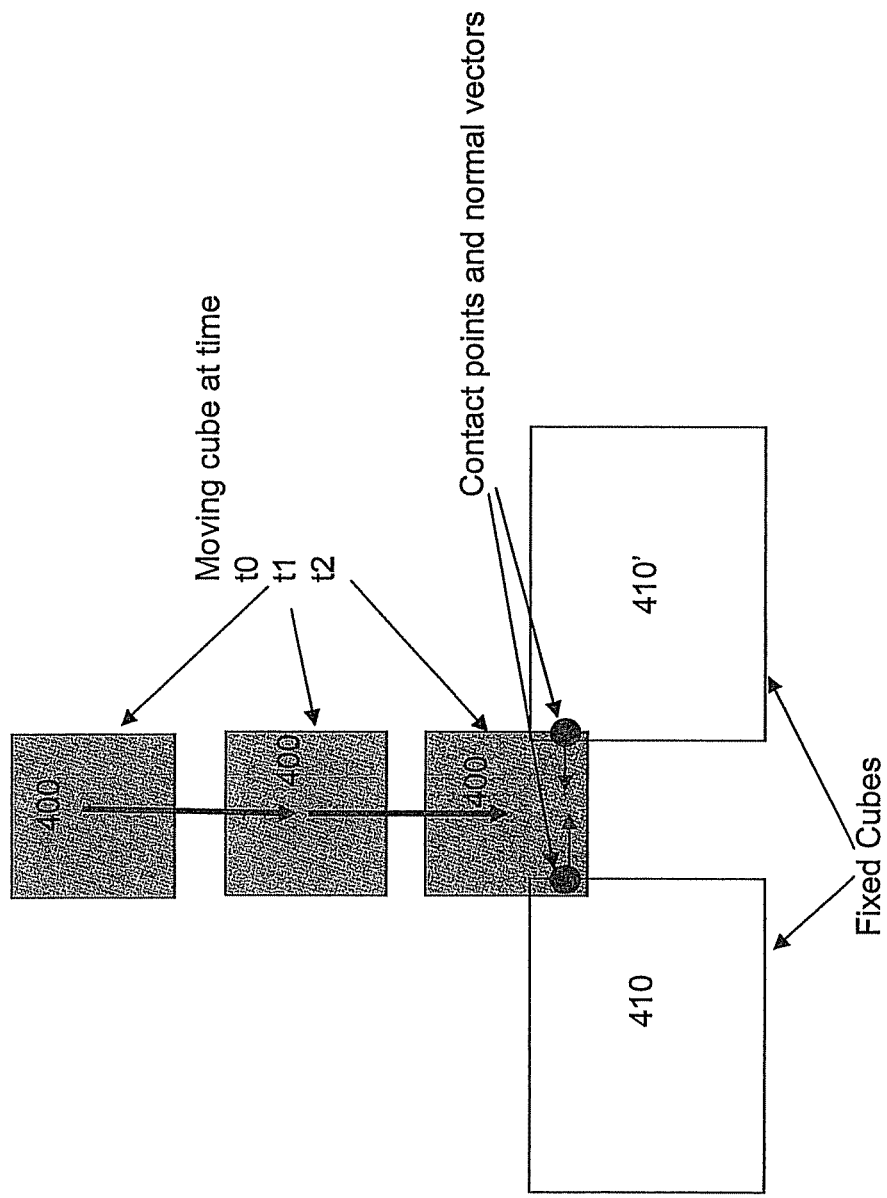
FIG. 14 is a diagram showing the collision of a moving cube with two fixed cubes suitable for resolving using an embodiment of the invention.

Another specialized collision example is shown in FIG. 14. Specifically, the object being simulated, a moving cube 400, enters a gap between two other fixed boxes 410, 410'. Calculating the contact information by individually looking at each overlapping pair (the box and the first cube's edge, and the box and the second cube's edge) only gives two contact points. One contact point indicates that the solution for freeing the box from the gap or for preventing the box from entering the gap initially is to move the box to the right. Unfortunately, the other contact point indicates a conflicting solution of moving the moving box to the left. The two opposing normal vectors show these conflicting solutions. However, accurate simulation of the event would indicate that the correct solution is to move the box up and out of the gap.

As a result, establishing an algorithmic solution to prevent objects from initially interpenetrating and for satisfactorily resolving object penetration events once they occur is one aspect of the invention. As described in more detail below, extensions of collision detection and depth penetration calculation algorithms are used to determine how to recover from penetration and object overlaps. Since such events would otherwise cause a simulation failure, these aspects of the invention improves the level of realism for a particular game or simulation.

One approach for calculating the penetration depth and the direction to resolve the condition of two or more polytopes overlapping, involves performing multiple distance and direction calculations simultaneously to generate the distance and direction necessary to resolve the polytope overlap. One aspect of the invention extends the Gilbert-Johnson-Keerthi (GJK) depth penetration algorithm to include the generation of two or more sets of vector data to solve multi-body penetration problems.

Furthermore, the general concept of generating a plurality of sub-problems associated with a particular collision or overlap scenario, generating a set of penetration vectors $D_s$ for each sub-problem, and evaluating the different sets of penetration vectors to determine the penetration vector having the smallest magnitude common to all of the vector sets associated with each sub-problem, represents one aspect of the invention. Additional details relating to this aspect of the invention follow from the discussion of FIGS. 14-17B provided below.

The first step of the method relating to this aspect of the invention is to divide the initial object overlap problem into an appropriate number of sub-problems. For example, in FIG. 14, three bodies are interacting, but only two sets of objects are in contact. Thus, for the collision of the box 400 with cube 410 one sub-problem is generated and for the collision of the box 400 with cube 410' another sub-problem is generated.

If N bodies are interacting wherein N=2, for each instance wherein one body contacts another body, one sub-problem associated with that contact pair is generated. However, for N>2, performing the penetration vector calculation method described herein is valid if there are only two movable objects involved such as one moving object with N convex sub-pieces and another moving object with M convex sub-pieces. An example of this would be two hammers overlapping in the simulation wherein each hammer is formed from sub-pieces. In such an instance, the method described herein generates a single penetration vector. In turn, this vector is used to move one compound object such that it no longer overlaps with the other compound object.

Figure 15A:
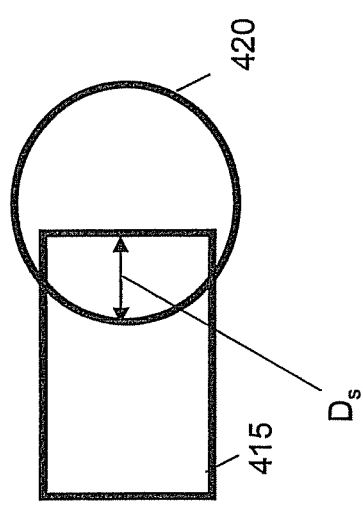
FIGS. 15A-15B are schematic diagrams depicting object representations suitable for use with an embodiment of the invention.
Figure 15B:
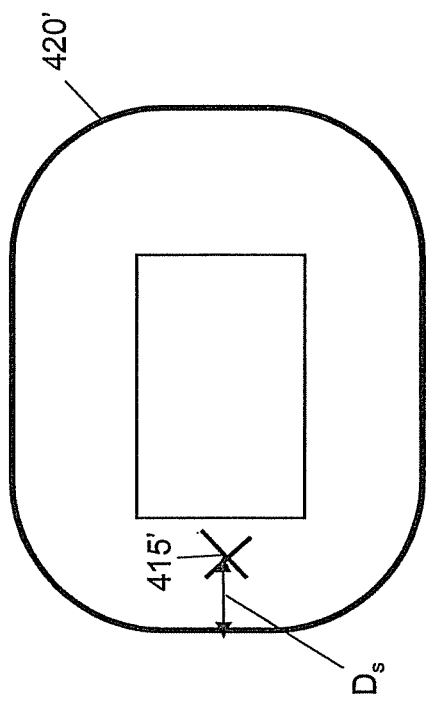

Once the determination of the appropriate number of sub-problems, the next stage of the method is to transform each sub-problem of overlapping/interpenetrating/colliding world objects into a Minkowski space representation, and to determine the depth and direction of a penetration vector $D_s$. The penetration vector connects the origin and the surface of the Minkowski representation. An example of two interpenetrating objects being transformed into a corresponding Minkowski representation, in two dimensions, is shown in FIGS. 15A and 15B. In FIG. 15A, two simulated objects, a rectangle 415 and a circle 420 are interpenetrating. In order to separate the two objects 415, 420 it is necessary to move them a certain minimal distance along a particular direction. Thus, one objective of this aspect of the invention is to find the distance and direction of the vector $D_s$, between body 415 and body 420. As only two bodies are interacting, only one sub-problem is necessary in this example. To determine the distance and direction of the vector $D_s$, a new body 420' is created that is the Minkowski sum of the difference of body 415 and body 420.

Specifically, this body 420' is created by the subtraction of every point in body 415 from every point in body 420. As a result, the body 420' includes the set of all possible vectors from body 420 to 415. Furthermore, if this sum contains the origin (the point 0, 0) then the bodies are touching or overlapping. The origin is designated as point 415' in FIG. 15B and corresponds to the point from which the set all of vectors that can be drawn from body 420 to body 415 originate. As a result, the penetration vector $D_s$ can be calculated as the closest distance from the origin 415' to the surface of 420'. The calculation of the distance and direction associated with the penetration vector $D_s$ is performed for each sub-problem generated. In order to evaluate the additional steps used to generate the distance and direction necessary to resolve the problem of multiple polytope overlapping another example is illustrative.

Figure 16A:
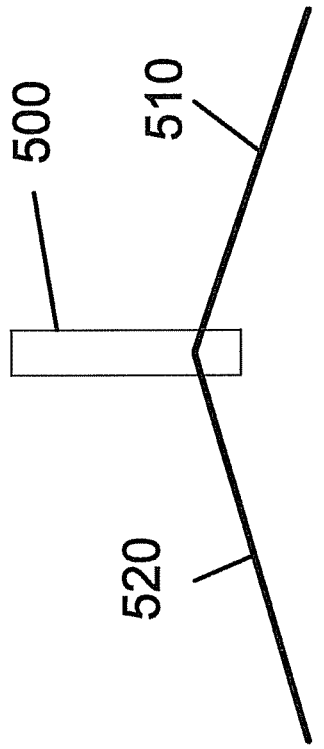
Figure 16B:
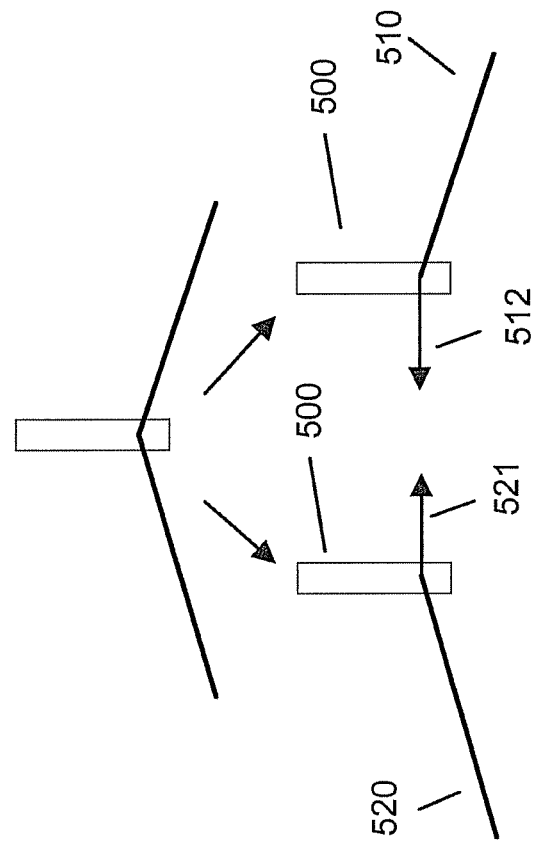

A suitable collision detection/collision resolution problem for describing the remaining steps of the method is depicted in FIG. 16A. In the example shown in FIG. 16A a box 500 is penetrating two triangles 520 and 510 that make up a portion of a landscape. This is analogous to the situation depicted in FIG. 14. As described above, the first step of the method is to define the necessary sub-problems and transform each sub-problem into a Minkowski space representation. Thus, the interaction of the three objects 500, 510, 520 can be separated into two problems as shown in FIG. 16B. Unfortunately, as was the case with the problem in FIG. 14, simply solving the two problems using traditional approaches causes the box to stick in place in the landscape. This results because when the contact normal vectors 521 and 512 are considered together, the result is to keep the box trapped in the landscape.

However, the problem would be solved by generating a single contact point with a penetration vector having an up direction. Under these circumstances, the constraint solver will correctly move the box up, out of the landscape. Although this is the answer to the problem shown, in a complex multiple overlapping body scenario, a fast algorithmic approach is required to determine the correct distance and direction to resolve the overlap.

As described above, once we have identified the sub-problems, each problem is transformed into a Minkowski representation. FIG. 16C shows the Minkowski sum representations of the objects from FIG. 16B. Specifically, the Minkowski representation 540 and 550 are formed from each of the two pairs of interacting objects in FIG. 16B. Thus, object 540 corresponds to the box 500 and the first triangle 520 and the second object 550 corresponds to the sum of the box 500 and the second triangle 510. Point 555 corresponds to the origin from which the penetration vector originates. Given the representation of FIG. 16C, the objective of the algorithm is finding the shortest path from the origin 555 to the surface of the Minkowski sum along the direction of the penetration vector.

FIG. 16D shows a Minkowski sum based solution for each of the box/triangle interactions as represented in Minkowski space. As discussed above, the objective is to find the penetration vector D. In FIG. 16D, the penetration vector for the box 500 and the triangle 520 is the shortest vector $D_{s1}$ from the origin 555 to the surface of the Minkowski sum 540. Returning to the physical simulation event that corresponds to the transformed problem depicted in FIG. 16D reveals, that moving body 500 by the distance associated with penetration vector in the direction of the vector $D_{s1}$ results in the box 500 separating from the triangle 520.

However, as shown in FIG. 16A, it is apparent that moving body 500 by this vector will not move it out of triangle 510. The direction of vector $D_{s1}$ is not the optimal direction for moving box 500 out of triangle 510. This is shown by vector $D_{s2}$ to move box 500 out of both triangles by moving it in this direction would require it to be moved by the length of this vector $D_{s2}$. This example illustrates the next step of the method, which is to consider the set of vectors that originate at the origin for each object 540, 550 and contact the surface of the Minkowski representations. The shortest vector common to these vector sets associated with each Minkowski representation yields the penetration depth vector that resolves the overlap scenario.

In the example shown in FIG. 16D, the desired direction is up, giving vectors 575 and 570. Choosing any other direction, and moving 555 in that direction to move out of both 540 and 550 would mean moving 555 further in one case. For example, moving the object 500 right results in one short vector $D_{s1}$, and one longer vector $D_{s2}$. Returning to FIG. 16A, it is clear that moving body 500 in the up direction provides the shortest path for it to leave the penetrating state for both triangular bodies 520, 510.

By generating a vector set associated with each Minkowski representation and comparing them to select the shortest vector oriented in the same direction that is common to all the sets yields a solution to the problem. Thus, for the two Minkowski representations 540 and 550 the up direction vectors 570, 575 correspond to the shortest vectors sharing the same orientation that are common to the set of vectors that originate at points 555 and contact the surface of each representation 540 and 550. As result, this method can be generalized to three dimensions and more than two Minkowski space bodies. Although the process of calculating all of the vectors from the origin to the Minkowski surface for each sub-problem may be computationally intensive, it represents a novel approach to resolving the problem of a plurality of overlapping bodies. However, techniques exists that can be used to reduce the computational intensity of the approach. For example, the GJK depth penetration algorithm allows a subset of the Minkowski representation to be considered to reduce the size of the set of possible candidate penetration vectors for each sub-problem.

Figure 16E:
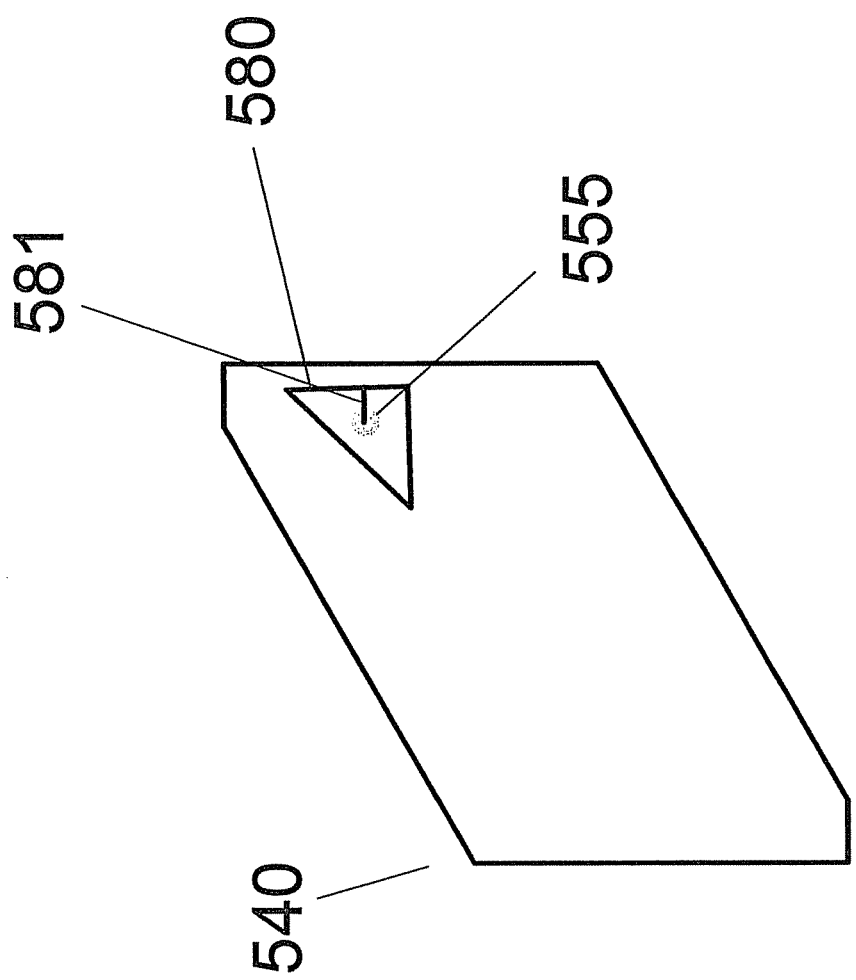

Thus, in some embodiments the entire Minkowski sum does not need to be calculated, saving processor time. Instead, a smaller topological space within each Minkowski representation of each sub-problem that contains the origin is initially determined and iteratively augmented in size as necessary. The initial shape of the topological neighborhood within the Minkowski representation can be determined using by computing the closest distance between two bodies that are disjoint. When the two bodies are overlapping, this algorithm fails to find a closest distance, but actually generates this initial shape. As an example of the use of an initial sub-shape or neighborhood within a Minkowski space body is shown in FIG. 16E. In the figure, the Minkowski representation 540, the origin 555, and a GJK generated shape 580 are shown.

Figure 16F:
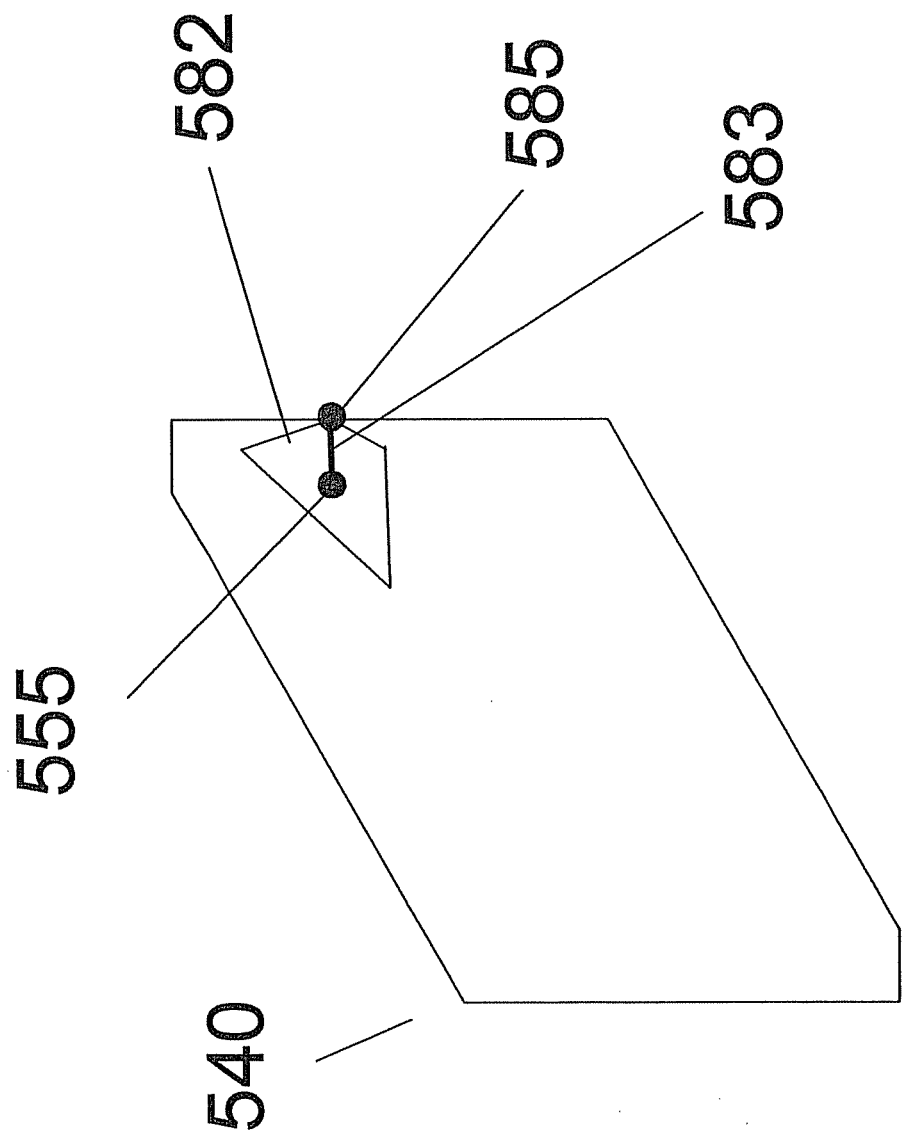

Turning to FIGS. 16E and 16F, the expanding polytope algorithm is depicted. As shown, the method determines the closest vector, 581 from point 555 to the surface of the GJK generated sub-shape 580. As an additional step, the method evaluates the original bodies 500 and 520 to find the distance from point 555 to the Minkowski surface 540 in the direction of this vector. This results in a new point 585 and a distance 583 from the origin 555 as shown in FIG. 16F. The GJK generated neighborhood 580 is then expanded to a larger shape 582 to incorporate this new point 585. This process is then repeated until such time as the closest point from 555 to the expanding shape 582 is also a point on the surface of the shape 540. As point 585 is actually a point on the Minkowski surface 540, the algorithm terminates. This process can be likened to blowing up a balloon inside a shape, and stopping when the balloon touches the shape. Although illustrated in two dimensions, this method is employed to solve the same problem in three dimensions, with the additional step of ensuring that the expanding shape is convex at each iteration of the algorithm.

Figure 17A:
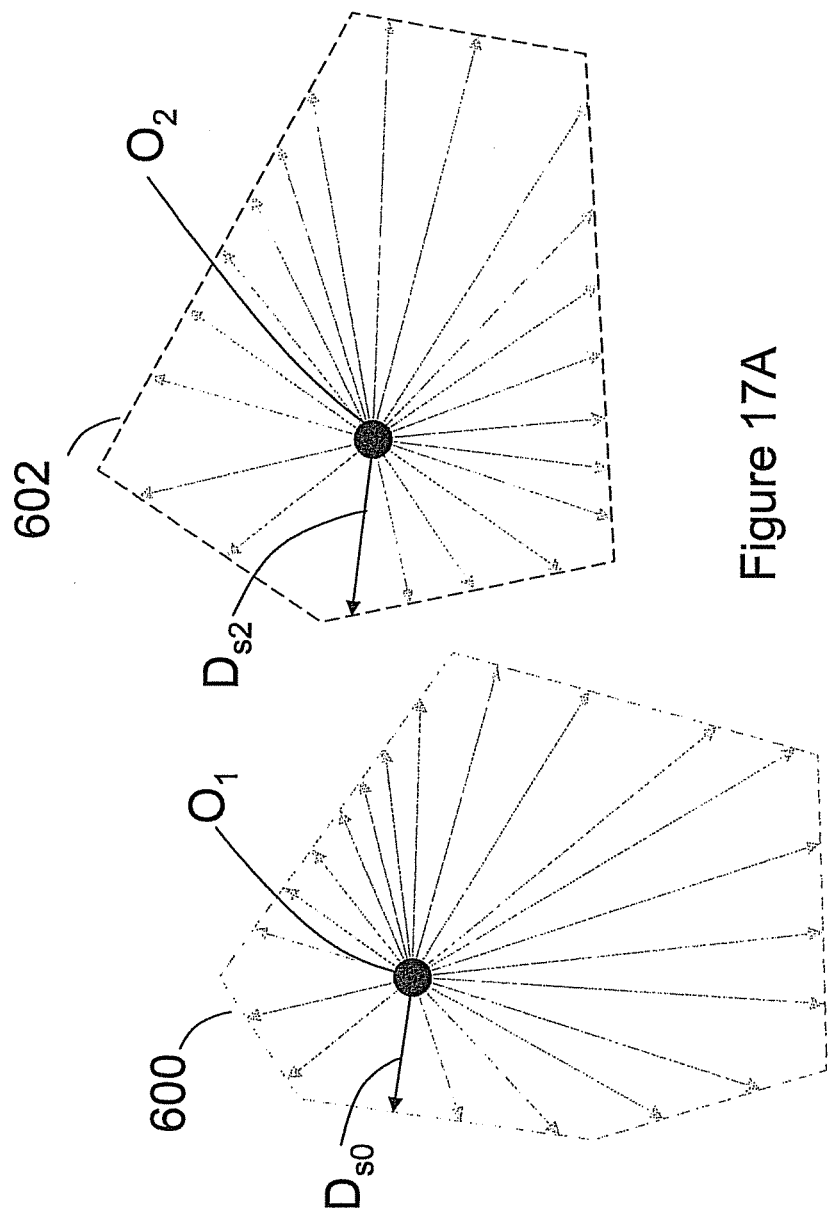
FIGS. 17A-17B are schematic diagrams depicting the use of overlapping Minkowski representations to determine penetration vector information suitable for resolving overlapping object problems according to an illustrative embodiment of the invention.

These steps are performed for each Minkowski representation of the sub-problems that are generated in response to an initial multi-body interpenetration problem. One process for evaluating the results of the possible penetration vectors generated for each sub-problem is described in FIGS. 17A and 17B. In FIG. 17A, two convex hulls 600, 602 representing Minkowski space sums of two pairs of overlapping objects. As such, the hulls 600, 602 each correspond to one overlapping object sub-problem. The direction in which the origins $O_1$, $O_2$ are closest to the surface of both hulls are shown by vectors $D_{s0}$ and $D_{s2}$.

One approach for determining each of these vector directions is to obtain a plurality of directional samples, and for each sample, calculate the distance from the origin to each hull's surface. The larger distance is stored for each sample; after all samples have been taken, the sample with the smallest distance is chosen. However, this approach can be computationally expensive. As a result, a geometric union between certain subspaces of within the Minkowski representation can be used to simultaneously solve for the correct penetration vector. Additional details relating to this approach are shown in FIG. 17B.

Figure 17B:
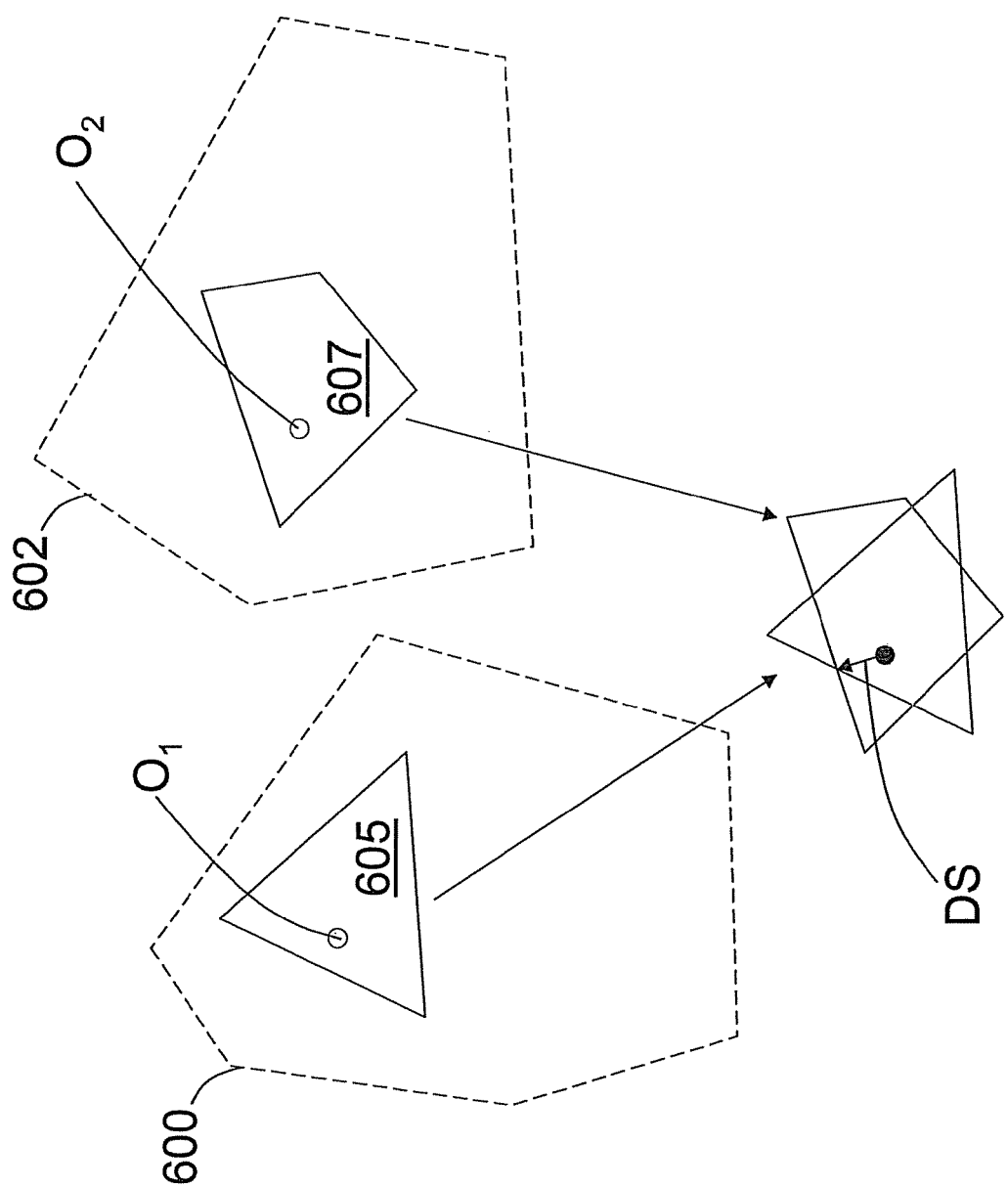

In FIG. 17B, the two hulls 600, 602 of FIG. 17A are illustrated such that each hull contains an expanded polytope neighbor 605, 607 inside each hull. These expanded polytopes are typically generated using the GJK algorithm or a variant thereof. The polytopes are not necessarily the same initially. The polytopes are both expanded in the same direction. This direction is chosen by evaluating the shortest distance from the origin $O_1$, $O_2$ to each polytope surface. To determine this direction, the polytopes are overlaid, and the distance to the intersection points are measured. The shortest distance from the origin to an intersection point is the shortest distance from the origin to both polytopes. This is shown by vector DS in the figure. This method is extended to three dimensions. In three dimensions, the triangles of the overlaid polytopes are intersected, and the closest points on the line segments resulting from these intersections are compared against each other.

Figure 18:
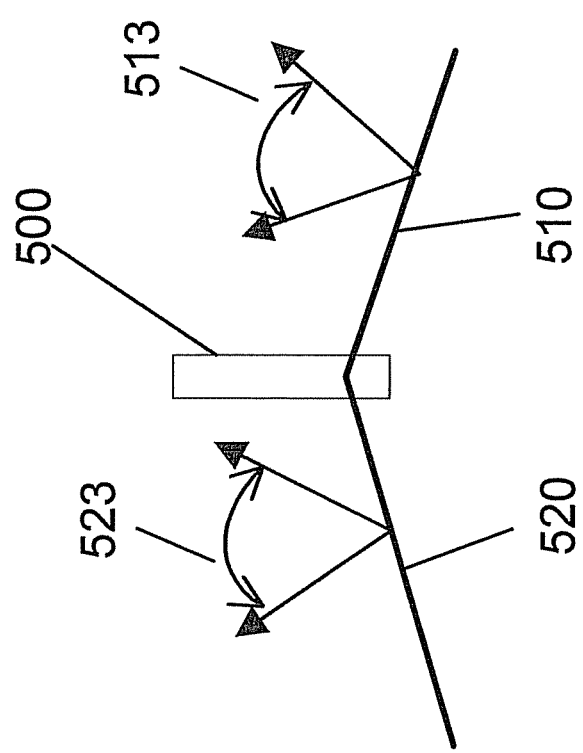
FIG. 18 is a schematic diagram depicting a solution to a particular collision detection problem by associating directional parameters with a simulated landscape according to an illustrative embodiment of the invention.

Another solution to the problem as stated above is to associate information with the triangles that specifies valid directions such that when objects interact with the triangles only valid interaction directions are possible. This is shown in FIG. 18. In a pre-processing step, triangle 520 has been associated with a range of possible directions 523, and triangle 510 is similarly associated with a range of possible directions 513. Using this information, the interaction of the body 500 with each triangle 520 and 510 are evaluated independently. However when expanding the polytope in the expanding polytope algorithm, only directions within these specified ranges are considered.

As a result, the directional information imparted to the triangles enables the process of resolving overlapping objects to be processed at a faster rate because the range of directions through which the expanding polytope algorithm cycles is constrained. As a result, the set of possible penetration vectors is reduced which speeds up the overall process of resolving the object overlap problem.

Instead of specifying a range of directions per triangle, a single direction can be specified. In this case, the expanding polytope algorithm does not need to be utilized. The point on the Minkowski sum of the overlapping objects is simply evaluated in this direction, and returned as the solution to the problem.

The methods and systems described herein can be performed in software on general purpose computers, servers, or other processors, with appropriate magnetic, optical or other storage that is part of the computer or server or connected thereto, such as with a bus. The processes can also be carried out in whole or in part in a combination of hardware and software, such as with application specific integrated circuits. The software can be stored in one or more computers, servers, or other appropriate devices, and can also be kept on a removable storage media, such as a magnetic or optical disks. Furthermore, the physics engine described herein can be implemented using as an SDK, an API, as middleware, and combinations thereof.

It should be appreciated that various aspects of the claimed invention are directed to subsets and substeps of the techniques disclosed herein. Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured by Letters Patent is the invention as defined and differentiated in the following claims, including all equivalents.

What is claimed is:

1. On a computing device comprising a processor, a method of resolving an interpenetration event involving a plurality of objects, the method comprising the steps of:
   at the processor:
   generating an instance of a physics engine;
   simulating a first object, a second object and a third object in a simulated environment using the physics engine using a plurality of frames;
   identifying, using the physics engine, a first set of interpenetrating objects using the physics engine, the first set of interpenetrating objects comprising the first object and the second object;
   identifying a second set of interpenetrating object pairs from the first set using the physics engine, the second set of interpenetrating object pairs comprising the first object and the third object;
   transforming the first set of interpenetrating objects into a first Minkowski space representation using the physics engine;
   transforming the second set of interpenetrating object pairs into a second Minkowski space representation using the physics engine;
   generating a vector set of candidate separation vectors for each of the first and the second Minkowski space representations, each candidate separation vector having a magnitude and a direction;
   selecting a separation vector from the vector sets of candidate separation vectors, wherein the separation vector selected comprises a direction and a minimum magnitude such that the first object does not penetrate the second object and such that the first object does not penetrate the third object to resolve the interpenetration of the plurality of simulated objects; and
   displaying the plurality of simulated objects, wherein the interpenetration of the first object with the second and third object is resolved prior to the display of the plurality of simulated objects.

2. The method of claim 1 wherein the separation vector chosen is the vector of smallest magnitude from all sets of candidate separation vectors that can resolve the interpenetration of the first object with the second and third object.

3. The method of claim 1 wherein the step of selecting the separation vector is performed by generating subspaces within each Minkowski space representation and overlapping the subspaces to identify a separation vector direction.

4. The method of claim 3 wherein the subspaces are generated using a Gilbert-Johnson-Keerthi (GJK) collision detection based method, further comprising reducing computational intensity of resolving interpenetration events involving three or more objects by evaluating a subset of the subspaces.

5. The method of claim 1 wherein the physics engine comprises a collision agent, the collision agent maintained in an electronic memory device and further comprising processing collisions between the first object and one or more of the second object and the third object for the plurality of frames.

6. The method of claim 1 further comprising determining the vector set of candidate separation vectors by defining a plurality of neighborhoods, wherein a sum of the neighborhoods equals a union of the first and second Minkowski space representations, and determining a candidate vector for the vector set of candidate separation vectors by evaluating a subset of the plurality of neighborhoods, the subset comprising less than the sum of the neighborhoods.

7. On a computing device comprising a processor, a method of resolving a plurality of interpenetrating objects in a simulated environment, the method comprising the steps of:

at the processor:
generating an instance of a physics engine;
simulating a plurality of objects in a simulated environment using the physics engine;
transforming a set of interpenetrating objects of the plurality of objects into Minkowski space representations using the physics engine by defining a Minkowski sum for each of the objects in the set of interpenetrating objects;
defining one or more neighborhoods comprising a shape within each Minkowski sum;
computing, using the physics engine, a closest distance between a first object and a second object of the set of interpenetrating objects, wherein the first object and the second object are disjoint;
defining the shape of the one or more neighborhoods using the closest distance;
iteratively determining a candidate separation vector for each neighborhood, wherein a total number of neighborhoods evaluated to determine the candidate separation vectors is less than the union of all of the Minkowski sums defined;
resolving an interpenetration state for the plurality of objects using one or more candidate separation vectors using the physics engine; and
displaying the plurality of simulated objects after resolving the interpenetration state thereof.

8. The method of claim 7, wherein a volume of a number of neighborhoods evaluated to determine the candidate separation vectors is less than a volume of a union of all of the Minkowski sums defined.

* * * * *